US009605108B2

(12) United States Patent
Hammond et al.

(10) Patent No.: US 9,605,108 B2
(45) Date of Patent: Mar. 28, 2017

(54) ISOSORBIDE-DERIVED EPOXY RESINS AND METHODS OF MAKING SAME

(71) Applicant: NEW JERSEY INSTITUTE OF TECHNOLOGY, Newark, NJ (US)

(72) Inventors: Willis Hammond, Chatham, NJ (US); Anthony East, Madison, NJ (US); Michael Jaffe, Maplewood, NJ (US); Xianhong Feng, Keamy, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 14/693,011

(22) Filed: Apr. 22, 2015

(65) Prior Publication Data
US 2015/0307650 A1 Oct. 29, 2015

Related U.S. Application Data

(60) Provisional application No. 61/983,839, filed on Apr. 24, 2014.

(51) Int. Cl.
*C08L 63/00* (2006.01)
*C07D 303/04* (2006.01)
*C07D 303/12* (2006.01)
*C07D 303/16* (2006.01)
*C07D 307/00* (2006.01)
*C08G 59/26* (2006.01)
*C08G 59/42* (2006.01)
*C08G 59/44* (2006.01)
*C08G 59/50* (2006.01)
*C08G 59/02* (2006.01)

(52) U.S. Cl.
CPC .......... *C08G 59/26* (2013.01); *C08G 59/027* (2013.01); *C08G 59/4238* (2013.01); *C08G 59/44* (2013.01); *C08G 59/504* (2013.01); *C08G 59/5026* (2013.01)

(58) Field of Classification Search
None
See application file for complete search history.

(56) References Cited

U.S. PATENT DOCUMENTS

| 3,041,300 | A | 6/1962 | Morrison | |
|---|---|---|---|---|
| 7,619,056 | B2 | 11/2009 | East | |
| 2008/0009599 | A1* | 1/2008 | East | C07D 493/04 528/1 |
| 2015/0010697 | A1* | 1/2015 | Soncini | C08G 59/42 427/116 |

FOREIGN PATENT DOCUMENTS

| CA | 2324279 A1 | 9/1999 | |
|---|---|---|---|
| DE | 10 2012 202 161 A1 * | 8/2013 | C08G 59/42 |
| DE | 102012202161 A1 | 8/2013 | |
| EP | 1062259 B1 | 10/2003 | |

OTHER PUBLICATIONS

Feng et al., "Sugar Based Polymers", Proceedings of the American Chemical Society, 2010, two pages.*
Feng et al., "Thermal analysis characterization of isosorbide-containing thermosets", Journal of Thermal Analysis & Calorimetry, vol. 109, 2012, pp. 1267-1275.*
Chrysanthos et al., "Preparation and properties of bio-based epoxy networks derived from isosorbide diglycidyl ether", Polymer, vol. 52, 2011, pp. 3611-3620.*
Fernando S, Adhikari S, Chandrapal C, Murali N. Biorefineries: Current Status, Challenges, and Future Direction. Energy & Fuels. 2006;20(4):1727-37.
Gontard N, Guilbert S. Bio-packaging: technology and properties of edible and/or biodegradable material of agricultural origin. Food Packaging and Preservation. Springer; 1994.
Georgopoulos ST, Tarantili PA, Avgerinos E, Andreopoulos AG, Koukios EG. Thermoplastic polymers reinforced with fibrous agricultural residues. Polymer Degradation and Stability. 2005;90(2):303-12. doi:10.1016/j. polymdegradstab.2005.02.020.
Narayan R. Polymeric Materials From Agricultural Feedstocks, Ch. 1, pp. 1-27, Polymers from Agricultural Coproducts. ACS Symposium Series, vol. 575. American Chemical Society; May 5, 1994. doi: 10.1021/bk-1994-0575.ch001.
Kricheldorf HR. "Sugar Diols" as Building Blocks of Polycondensates, J. Macromolecular Science, Part C, 1997;37(4):599-631.
Mohanty AK, Misra M, Drzal LT. Sustainable Bio-Composites from Renewable Resources: Opportunities and Challenges in the Green Materials World. Journal of Polymers and the Environment. 2002;10(1/2):19-26.
Azapagic A, Emsley A, Hamerton I. Polymers : the environment and sustainable development. Chapter 1, pp. 1-15; West Sussex, England; Hoboken, NJ: J. Wiley; 2003.
Willke T, Vorlop KD. Industrial bioconversion of renewable resources as an alternative to conventional chemistry. Applied Microbiology and Biotechnology. 2004;66(2):131-42.
Fukushima K, Kimura Y. Stereocomplexed polylactides (Neo-PLA) as high-performance bio-based polymers: their formation, properties, and application. Polymer International. 2006;55(6):626-42.

(Continued)

*Primary Examiner* — Michael J Feely
(74) *Attorney, Agent, or Firm* — Timothy X. Gibson, Esq.; Gibson & Dernier LLP

(57) ABSTRACT

Isosorbide-derived epoxies and methods of making same are disclosed. Isosorbide and its isomers are attached to glycidyl ether to make crosslinkable epoxy resin monomers. Adding the hydrophobic functional group into the backbone of isosorbide epoxy or adjusting the amount and type of crosslinker is operable to modify the mechanical properties and water uptake ratio (from <1 wt % to >50 wt %) of the isosorbide-derived epoxies for different uses. High water uptake epoxies with controllable biodegradation rate are suitable for drug delivery systems or extracellular matrices for biomedical applications, while low water uptake epoxies with strong mechanical properties may be used for can coatings, bone cements and other industrial additives and adhesives.

7 Claims, 11 Drawing Sheets

(56) References Cited

OTHER PUBLICATIONS

Wool RP, Sun XS. Bio-based polymers and composites. p. 6; pp. 48-54; pp. 369-410; Boston: Elsevier Academic Press; 2011.
Mohanty AK, Misra M, Hinrichsen G. Biofibres, biodegradable polymers and biocomposites: An overview. Macromolecular Materials and Engineering. 2000;276/277(1):1-24.
Thiruvenkatachari R, Ouk Kwon T, Shik Moon I. Application of Slurry Type Photocatalytic Oxidation-Submerged Hollow Fiber Microfiltration Hybrid System for the Degradation of Bisphenol A (BPA). Separation Science and Technology. 2005;40(14):2871-88. doi:10.1080/01496390500333160.
Haishima Y, Hayashi Y, Yagami T, Nakamura A. Elution of bisphenol-A from hemodialyzers consisting of polycarbonate and polysulfone resins. Journal of Biomedical Materials Research. 2001;58(2):209-15. doi:10.1002/1097-4636(2001)58:2<209::aid-jbm1009>3.0.co;2-7.
Yamamoto T, Yasuhara A, Shiraishi H, Nakasugi O. Bisphenol A in hazardous waste landfill leachates. Chemosphere. 2001;42(4):415-18. doi:10.1016/s0045-6535(00)00079-5.
Staples CA, Dom PB, Klecka GM, Oblock ST, Harris LR. A review of the environmental fate, effects, and exposures of bisphenol A. Chemosphere. 1998;36(10):2149-73. doi:10.1016/s0045-6535(97)10133-3.
Schafer TE, Lapp CA, Hanes CM, Lewis JB, Wataha JC, Schuster GS. Estrogenicity of bisphenol A and bisphenol A dimethacrylate in vitro. Journal of Biomedical Materials Research. 1999;45(3):192-7. doi:10.1002/(sici)1097-4636 (19990605)45:3<192::aid-jbm5>3.0.co;2-a.
Steinmetz R, Mitchner NA, Grant A, Allen DL, Bigsby RM, Ben-Jonathan N. The Xenoestrogen Bisphenol A Induces Growth, Differentiation, and c-fos Gene Expression in the Female Reproductive Tract. Endocrinology. 1998;139 (6)2741-7. doi:10.1210/en.139.6.2741.
Krishnan A, Stathis P, Permuth S, Tokes L, Feldman D. Bisphenol-A: an estrogenic substance is released from polycarbonate flasks during autoclaving. Endocrinology. 1993;132(6):2279-86. doi:10.1210/en.132.6.2279.
Feng X, East Anthony J, Hammond W, Jaffe M. Sugar-Based Chemicals for Environmentally Sustainable Applications. Comtemporary Science of Polymeric Materials. ACS Symposium Series, vol. 1061: American Chemical Society; 2010. p. 3-27.
Chatti S, Bortolussi M, Loupy A. Synthesis of New Diols Derived from Dianhydrohexitols Ethers under Microwave-Assisted Phase Transfer Catalysis. Tetrahedron. 2000;56(32):5877-83. doi:Doi: 10.1016/s0040-4020(00)00539-1.
Chatti S, Bortolussi M, Loupy A. Synthesis of diethers derived from dianhydrohexitols by phase transfer catalysis under microwave. Tetrahedron Letters. 2000;41(18):3367-70. doi:Doi: 10.1016/s0040-4039(00)00416-0.
Fenouillot F, Rousseau A, Colomines G, Saint-Loup R, Pascault JP. Polymers from renewable 1,4:3,6-dianhydrohexitols (isosorbide, isomannide and isoidide): A review. Progress in Polymer Science. 2010;35(5):578-622. doi:DOI 10.1016/j.progpolymsci.2009.10.001.
Feng X, East AJ, Hammond WB, Zhang Y, Jaffe M. Overview of advances in sugar-based polymers. Polymers for Advanced Technologies. 2011;22(1):139-50. doi:10.1002/pat.1859.
Feng X, Saini P, Vusto G, Hammond WB, East AJ, Jaffe M. Synthesis and thermal analysis of sugar based polyesters as candidate of high performance biopolymers. Bioengineering Conference (NEBEC), 2011 IEEE 37th Annual Northeast; 2011 Apr. 1-2, 2011.
Mills JA. The Stereochemistry of Cyclic Derivatives of Carbohydrates. In: Melville LW, editor. Advances in Carbohydrate Chemistry. Academic Press; 1955. p. 1-53.
Storbeck R, Rehahn M, Ballauff M. Synthesis and properties of high-molecular-weight polyesters based on 1,4:3,6-dianhydrohexitols and terephthalic acid. Die Makromolekulare Chemie. 1993;194(1):53-64.
Storbeck R, Ballauff M. Synthesis and thermal analysis of copolyesters deriving from 1,4:3,6-dianhydrosorbitol, ethylene glycol, and terephthalic acid. J Appl Polym Sci. 1996;59:1196-202.
Cope AC, Shen TY. The Stereochemistry of 1,4: 3,6-Dianhydrohexitol Derivatives. Journal of the American Chemical Society. 1956;78(13):3177-82. doi:10.1021/ja01594a055.
Feng X, DeMartino R, East AJ, Hammond WB, Jaffe M. Synthesis and characterization of isosorbide derived polyols as highly effective humectants. Bioengineering Conference, Proceedings of the 2010 IEEE 36th Annual Northeast; 2010 Mar. 26-28, 2010.
Feng X, Jaffe M, Hammond WB, East AJ. Synthesis of corn-derived carbohydrate derivatives as effective multifunctional sunscreens. Bioengineering Conference, 2009 IEEE 35th Annual Northeast; 2009 Apr. 3-5, 2009.
Marie Chrysanthos, et al. Preparation and properties of bio-based epoxy networks derived from isosorbide diglycidyl ether, Polymer No. 52, p. 3611-3620 (2011).
Xianhong Feng, et al. Thermal analysis characterization of isosorbide-containing thermosets. Journal Therm Anal Calorim, No. 109, pp. 1267-1275 (2012).

* cited by examiner

ISOSORBIDE-DERIVED EPOXY RESINS AND METHODS OF MAKING SAME

CROSS-REFERENCE TO RELATED APPLICATIONS

This application claims the benefit of U.S. Provisional Patent Application Ser. No. 61/983,839 filed Apr. 24, 2014, the entirety of which is incorporated herein by reference.

FIELD OF THE INVENTION

This invention relates to bio-based thermoset and plant-based epoxy materials.

BACKGROUND OF THE INVENTION

There is a growing importance to develop green materials from renewable resources that can relieve the widespread dependence on fossil fuels. The urgency of replacing petroleum-based chemicals arises from depletion of petroleum reserves that could occur in the next 50 years. As a result, a dramatic increase in the price of material based on fossil fuels will lead a series of materials from renewable resources that today are considered expensive to become attractive. In the EU alone, annual consumption of bisphenol A (BPA), a petroleum-based compound, was estimated at approximately 640,000 tons ($640 \times 10^6$ kg) per year. BPA is widely used in the thermosets and thermoplastics industries, which manufacture items such as plastic lining of cans used for food, polycarbonate baby bottles and tableware, and white dental fillings and sealants. The growing global production of BPA not only puts a burden on finite petroleum resources but also is detrimental to the environment. Low levels of BPA have been found to possess "xenoestrogen" effects where BPA appears to mimic female hormone estrogen to disrupt the chemical messenger system in humans. The consumer attack, retail bans, and regulatory examination have sounded the alarm on BPA for its alleged health impacts. The growing environmental consciousness necessitates the bio-derived replacement of BPA in the near future.

SUMMARY OF THE INVENTION

Sugar based monomers, polymers and low molar mass additives have emerged as an exciting topic in green chemistry research, due to the world wide focus on sustainable material. With growing awareness of bisphenol A (BPA) as a xenoestrogen, isosorbide and its isomers having remarkable chemical properties and attractive price hold promise as "green" alternatives to BPA and many other thermosets and thermoplastics. Isosorbide and its isomers are dihydroxyethers made by dehydrating hexitols which are polyhydric alcohols derived from hexose sugars by reduction, chiefly glucose, mannose and idose. The rigid structures and special molecular geometry make these materials good candidates to replace BPA without the endocrine disrupting effect. These materials can serve as renewable building blocks for many applications including thermoplastics, thermosets and specialty chemicals. Isosorbide and its isomers can be attached to glycidyl ether to make crosslinkable epoxy resin monomers with properties similar to bis-A glycidyl ether. By adding the hydrophobic functional group into the backbone of isosorbide epoxy or adjusting the amount and type of crosslinker, the mechanical properties and water uptake ratio of the isosorbide-derived epoxies are modified for different applicable areas. Multiple isosorbide-based epoxies have been developed demonstrating versatility in many different applications. High water uptake epoxies with controllable biodegradation rate are suitable for drug delivery systems or extracellular matrices for biomedical applications while the low water uptake epoxies with strong mechanical properties are suitable to be used for can coatings, bone cements and other industrial additives and adhesives.

In accordance with one or more embodiments isosorbide-derived epoxy resins are disclosed including an isosorbide glycidyl ether and a curing agent. The isosorbide glycidyl ether may be for example but not by way of limitation an isosorbide diglycidyl ether, biisosorbide triglycidyl ether, or isosorbide bis(glycidyl benzoate)("IsoBGB"). IsoBGBs may include for example isosorbide bis(4-glycidyl benzoate), isosorbide bis(3-glycidyl benzoate) and isosorbide bis(2-glycidyl benzoate).

In accordance with some embodiments the curing agent is a crosslinker. Suitable crosslinkers include but are not limited to polyetheramine crosslinkers, polyamide resin crosslinkers, isophorone diamine crosslinkers, and methyl-5-norbornene-2,3-dicarboxylic anhydride (NMA) with benzyl dimethyl amine (BDMA) as catalyst.

In further embodiments isosorbide bis(glycidyl benzoate) compounds are disclosed, including but not limited to isosorbide bis(4-glycidyl benzoate), isosorbide bis(3-glycidyl benzoate) and isosorbide bis(2-glycidyl benzoate).

In still further embodiments methods of making an isosorbide-derived epoxy resin include combining an isosorbide glycidyl ether with a curing agent. The isosorbide glycidyl ether may be for example isosorbide diglycidyl ether, biisosorbide triglycidyl ether, an IsoBGB or the like. The curing agent may be a crosslinker such as but not limited to a polyetheramine crosslinker, a polyamide resin crosslinker, an isophorone diamine crosslinker, methyl-5-norbornene-2,3-dicarboxylic anhydride (NMA) with benzyl dimethyl amine (BDMA) as catalyst, etc. Methods disclosed herein may include adjusting the amount of curing agent to modify the mechanical properties and/or water uptake ratio of the isosorbide-derived epoxy resin.

BRIEF DESCRIPTION OF THE DRAWINGS

So that those having ordinary skill in the art will have a better understanding of how to make and use the disclosed systems and methods, reference is made to the accompanying figures wherein.

DETAILED DESCRIPTION OF THE INVENTION

Figure 1:
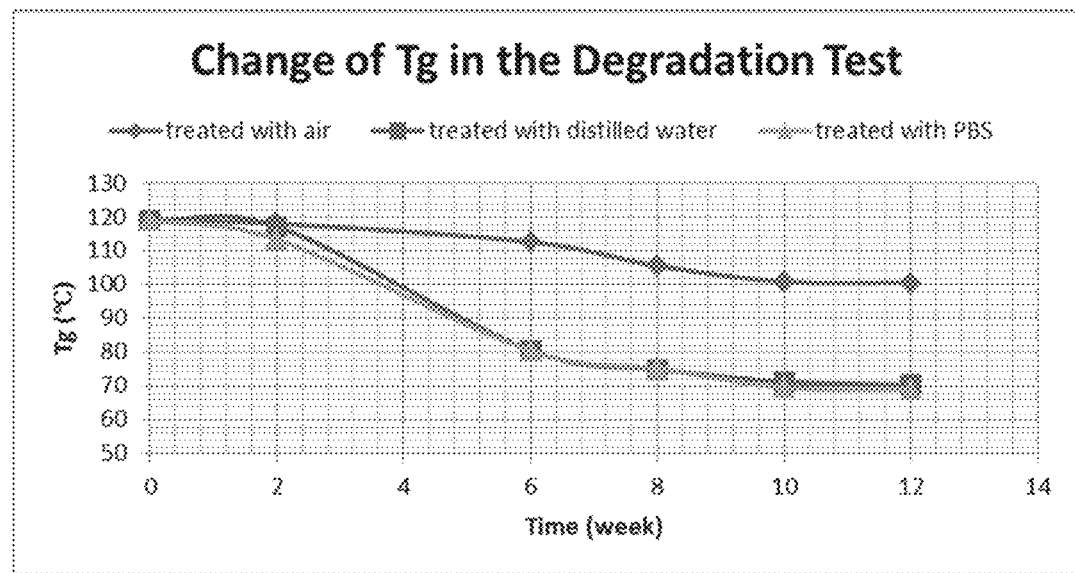
FIG. 1 is a graphical depiction of change in Tg in degradation test in accordance with one or more embodiments of the present invention.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

In accordance with an embodiment isosorbide, and/or isomers thereof, are attached to glycidyl ether to make crosslinkable epoxy resin monomers. Adding a hydrophobic functional group into the backbone of isosorbide-derived epoxies or adjusting the amount and type of crosslinker is operable to modify the mechanical properties and water uptake ratio (from <1 wt % to >50 wt %) of the isosorbide-derived epoxies for different uses. High water uptake epoxies with controllable biodegradation rate are suitable for drug delivery systems or extracellular matrices for biomedical applications, while low water uptake epoxies with strong mechanical properties may be used for can coatings, bone cements and other industrial additives and adhesives.

Exemplary isosorbide-derived epoxies and methods of making same are detailed below.

Isosorbide Diglycidyl Ether

Freshly-prepared unpurified diallyl isosorbide was treated with meta-chloroperbenzoic acid in methylene chloride to generate isosorbide diglycidyl ether as shown below. Diallyl isosorbide may be prepared by a Williamson ether reaction by heating the isosorbide with allyl bromide in sodium hydroxide solution.

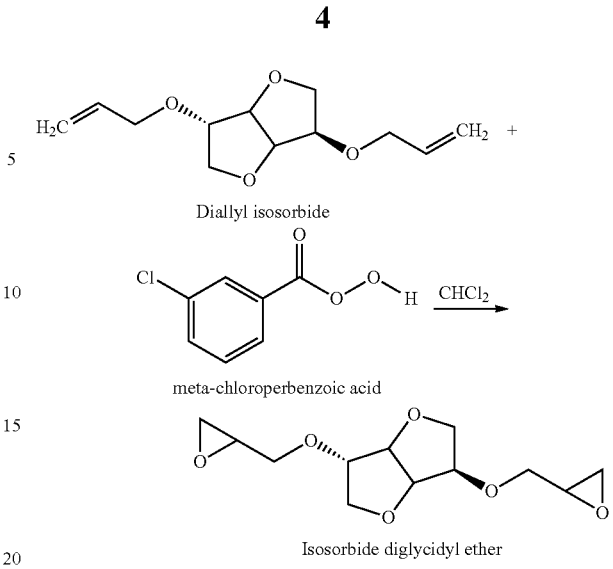

The isosorbide diglycidyl ether has an epoxide equivalent weight of 129 Daltons, which is defined as the total molecular weight divided by number of epoxy group. In the isosorbide diglycidyl ether the two hydroxyl groups of isosorbide are linked with two epoxides. Other methods of making the diglycidyl ether may be employed without departing from the spirit and scope of the present disclosure.

Bisisosorbide Triglycidyl Ether

In certain embodiments of the present invention the following exemplary protocol for bisisosorbide triglycidyl ether synthesis may be used.

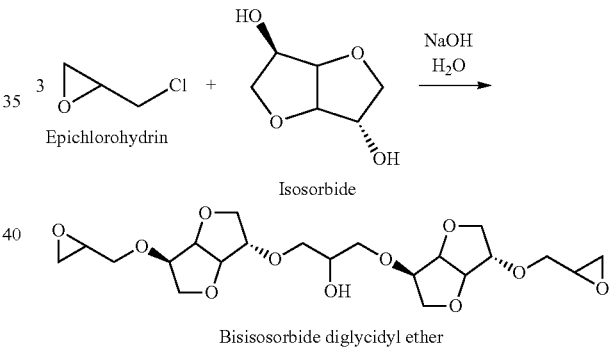

Bisisosorbide triglycidyl ether may be prepared by heating the isosorbide with 50% sodium hydroxide solution and a large excess of epichlorhydrin, which is used to azeotrope away the water. Two equivalents isosorbide are linked by three molecules of epichlohydrin to form the epoxide dimer as shown above. The bisisosorbide diglycidyl ether with epoxide equivalent weight of 223 Daltons corresponding to 446 Daltons of molecular weight of monomer, indicates a dimeric structure with two isosorbide units joined with a 2-hydroxy-1,3-propane diether link and capped with glycidyl ether units for said embodiments. The skilled artisan will recognize other methods of preparing the bisisosorbide triglycidyl ether may be employed.

Isosorbide bis(glycidyl benzoates)("IsoBGB")

One class of exemplary epoxy embodiments of the present invention is isosorbide bis(glycidyl benzoates) ("IsoBGB"). Said class includes, but is not limited to, isosorbide bis(4-glycidyl benzoate) and isosorbide bis(3-glycidyl benzoate), isosorbide bis(2-glycidyl benzoate), also referred as IsoB4 GB, IsoB3 GB and IsoB2 GB respectively.

In one embodiment of the present invention said IsoB-GB's were prepared by esterifying allyloxybenzoyl chloride on both sides of isosorbide followed with epoxidation reactions by using meta-chloroperbenzoic acid as catalyst.

Scheme I depicts an example of a synthetic route for isosorbide bis(4-glycidyl benzoate).

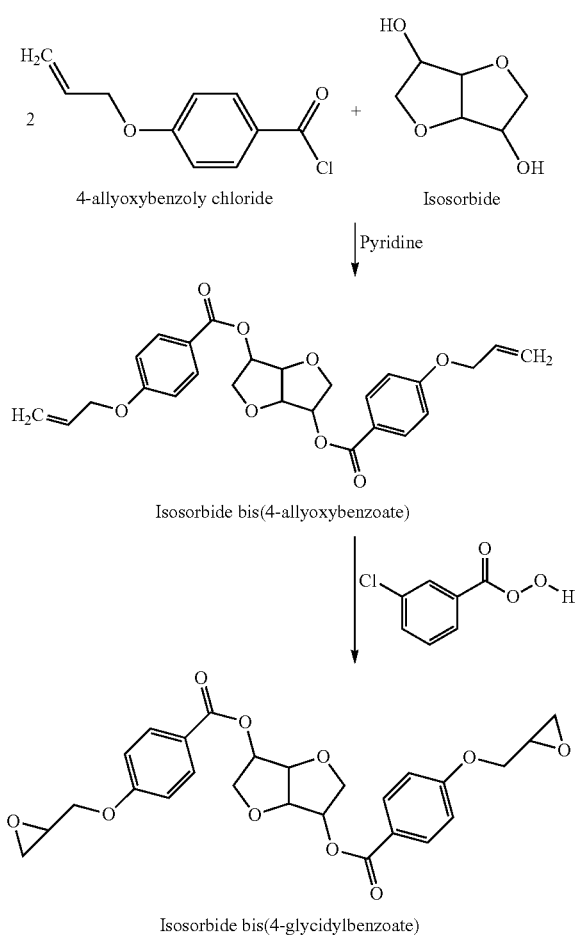

In one embodiment, the esterification reaction was run in a 500 ml 3-neck round bottom flask with a magnetic stirrer. A 50 ml Kontes "Bantam-Ware"™ pressure-equalizing (PE) tap funnel with a nitrogen inlet tube was fitted into its necks. A bubbler tube was connected to the $2^{nd}$ neck to measure the nitrogen flow and a thermometer was set in the third neck to measure the temperature of the flask. In order to control the reaction temperature, the whole system was placed in an ice bath. After the flask was charged with 21.9 gm isosorbide and 200 ml dry pyridine, 58.95 gm 4-allyoxybenzoyl chloride in 150 ml dichloromethane (DCM) was added slowly into the flask through the PE funnel. The solution immediately started to form a white solid. In order to keep the reaction proceeding steadily, the flask temperature was kept below 5° C. After running overnight, some brown solid was formed in the flask. To neutralize unreacted pyridine, the reaction mixture was poured into a beaker containing 200 ml concentrated HCl and 250 ml deionized water. The mixture was separated in a 1000 ml Squibb funnel. The aqueous phase was washed with 100 ml DCM three times to extract any traces of the organic-soluble products. The DCM layer was again shaken once with 200 ml sodium bicarbonate, 200 ml brine solution and once with 200 ml de-ionized water. Anhydrous $MgSO_4$ was added to the DCM solution and the mixture left to dry 3 hours in the freezer. After that, the solution was filtered through a Buchner funnel with #4, 12 cm filter paper. The filtrate was taken down on a Büchi Rotovap™ to get remove DCM. The crude product obtained was a white solid weighing 68.4 gm (97.8% theoretical yield). Freshly-prepared unpurified diallyl isosorbide was recrystallized from methanol and treated with the meta-chloroperbenzoic acid in DCM to generate IsoB4 GB.

Below are further exemplary embodiments of methods for making IsoBGBs. It will be recognized the embodiments below are illustrative and non-limiting. Numbering convention in the paragraphs below refers to Scheme II.

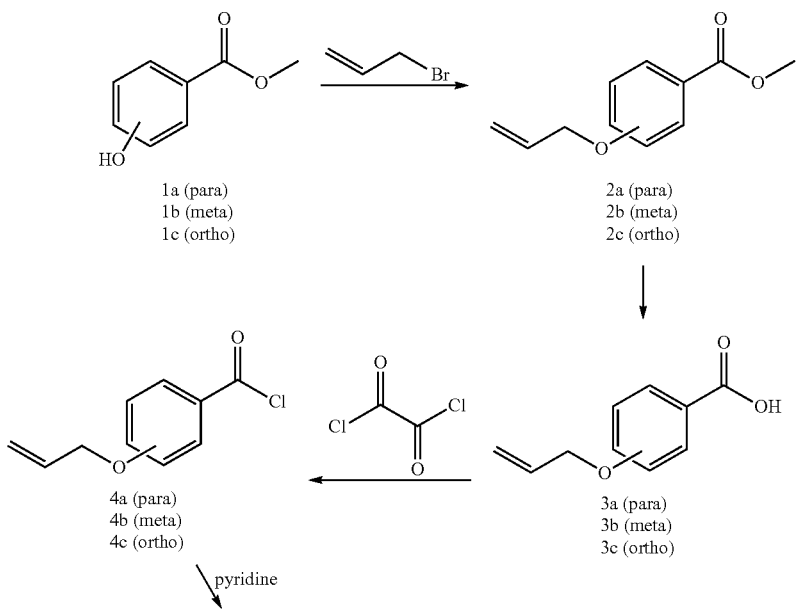

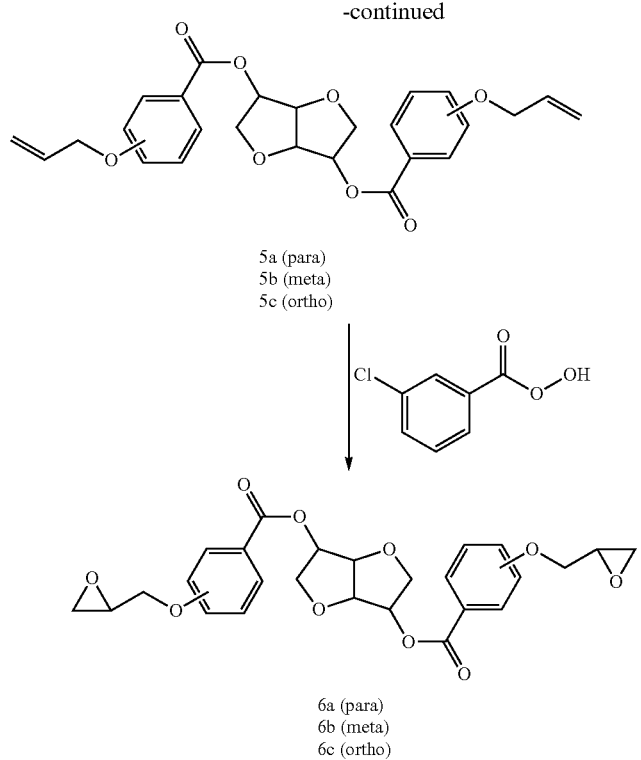

5a (para)
5b (meta)
5c (ortho)

6a (para)
6b (meta)
6c (ortho)

Preparation of Methyl 4-Allyloxybenzoate (2a): The reaction was run in a 2000-ml 3-necked flask with a paddle-stirrer, reflux condenser, dropping funnel and gas inlet and an outlet bubbler on top of the condenser. The flask was stirred and heated with a heating mantle. The flask was charged with 152 gm (1.00 mole) of methyl 4-hydroxybenzoate, 200 gms (excess) anhydrous potassium carbonate and one liter of dry acetone. The tap funnel was charged with 133 gm (1.10 moles; 91.8 mls) of allyl bromide. The mixture was stirred and heated to gentle reflux, this being important to stop the potassium carbonate from agglomerating into a solid mass. Once stirring, the allyl bromide was added dropwise at about one drop per second. It was soon noticeable that the exit gases bubbled out faster than the inlet nitrogen flow as $CO_2$ was evolved in the reaction. The reaction was run for 22 hours and left to cool to room temperature. The contents of the reaction flask were then added to 2000 ml deionized water in a big beaker and stirred manually until all the solids had dissolved. This gave a cloudy solution which was divided into thirds and each portion extracted with 400 ml diethyl ether in a 2000-ml separatory funnel. The combined ethereal extracts were washed with brine solution and dried over anhydrous magnesium sulfate. After filtration, the ether solution was taken down on the Rotovap to give 189.1 gms (98.5% theory) of a pale yellow oil; NMR spectrum showed it was substantially pure. In a later run, the ester was distilled under reduced pressure to give a colorless oil, Bpt 110-2° C. @ 0.7 mm Hg.

Saponification of Methyl Ester to 4-Allyloxybenzoic Acid (3a): The reaction was run in a three-neck 2000 ml flask heated on a soft heating mantle on a stirrer hotplate fitted with an Allihn reflux condenser. Nitrogen was passed in via an inlet tube and out via a bubbler on top of the condenser. The reaction flask was charged with 184.5 gms, (0.96 mole) of crude methyl 4-allyloxybenzoate and one liter of methanol. The mixture was stirred magnetically while a solution of 73 gm potassium hydroxide (1.30 moles) was made up in 200 mls distilled water in a 500 ml Erlenmeyer flask. The basic solution was added all at once to the reaction flask and the mixture stirred and refluxed gently overnight under the nitrogen atmosphere. There was no discoloration as a result.

Next day, the clear solution was chilled in an ice bath and soon crystallized solid with a mass of platelets of the potassium salt of the benzoic acid. The slurry of crystals was transferred to the Rotovap and taken down until about half the liquid had been removed. One liter of distilled water was added to give a clear solution which was stirred in a 4-liter beaker while 100 mls concentrated hydrochloric acid were added dropwise. A thick, white precipitate came out. The mixture was chilled in ice then filtered on a large 24 cm Buchner funnel and sucked dry. The damp-dry solid was added to a 3-liter Erlenmeyer and 1100 mls denatured ethanol and 500 mls distilled water added. The mixture was heated until a clear solution formed and the hot solution filtered and left to crystallize out. The product came out as large, flat, glistening plates, weighing 124 gms after drying at 45° C. in the vacuum oven (73% theory). The Mpt. of the product was 163-4° C. A second crop was obtained by evaporating the mother liquors.

Preparation of 4-Allyloxy Benzoyl Chloride (4a): The reaction was run at room temperature in the hood in a 2000 ml 3-neck flask fitted with a magnetic stir-bar, gas inlet tube, a 125-ml PE dropping funnel and a reflux condenser topped with a gas bubbler tube. All glassware was dried overnight at 110° C. and cooled under a slow nitrogen sparge. The flask was charged with 120 gm recrystallized 4-allyloxybenzoic acid (0.674 mole), 800 mls dry chloroform and nine drops of dimethylformamide. In the tap funnel was placed 85.6 gms, 59 mls (0.674 mole) of pure oxalyl chloride. The solution was stirred and the oxalyl chloride added dropwise under nitrogen. There was a brisk evolution of gas (CO, $CO_2$ and HCl) from the bubbler. The outlet tube led to a gas absorption trap to dissolve the hydrogen chloride gas in cold water. The reaction was run overnight in the cold and by next day a little gas was still being produced. The flask was then fitted into a heating mantle and gently refluxed for one hour to complete the removal of volatiles.

The bulk of the chloroform was taken off by distillation at atmospheric pressure until the still head reached 75° C. After cooling, the final traces of chloroform etc. were removed on the Büchi Rotovap to give a yield of 130.6 gms of pale yellow oil (98.4% theory). On standing in the freezer at −15° C. this solidified to a yellow solid. According to the literature, the acid chloride boils at 186-191° C. @ 45 mm Hg. [JACS: 64; 1691-4; (1942)]

Preparation of Isosorbide 2,5-bis(4-Allyloxybenzoate) (5a): The reaction was run in a 3000 ml 4-neck reaction flask fitted with a central paddle stirrer, 500-ml PE tap-funnel, (with a screw-in Teflon plug rather than a turncock) and a reflux condenser. All glassware was thoroughly dried at 110° C. first and let cool under a flow of dry nitrogen. The apparatus was quickly assembled in the hood and a long stem thermometer calibrated from −50 to +50° C. fitted, as well as an inlet for nitrogen and an exit bubbler on top of the condenser. The flask was chilled in a large ice-bath containing a mixture of ice and salt. The flask was charged with 50 gm (0.34 mole) pure isosorbide, 400 ml dry pyridine, 400 ml dry dichloromethane and 2.0 gm of 4-dimethylaminopyridine as an acylation catalyst. The system was sparged with a slow stream of nitrogen and stirred slowly to reach temperature equilibrium.

Meanwhile, a solution of 136 gm (0.69 mole) of purified 4-allyloxybenzoyl chloride dissolved in 300 mls of dichloromethane was made up in a stopped RB flask stirred magnetically and once dissolved, chilled to −16° C. in the freezer before it was added to the tap-funnel. The pale yellow, slightly cloudy solution of acid chloride was added dropwise, at one drop per second, to the reaction mixture with brisk stirring, keeping the batch temperature between 0 and 5° C. The addition took about two hours and the reaction was left to stir overnight and warm up to room temperature.

Next day a thick precipitate of pyridine hydrochloride had formed. The flask was removed from the ice bath and the outside of the flask dried off before placing it in a 3000 ml heating mantled and bringing the reaction to gentle reflux for two hours (batch temp ca 60° C.) with stirring. The reaction was cooled to room temperature and one liter of distilled water added with stirring to dissolve the pyridine salts. The lower dichloromethane layer was run off and washed with 40% v/v hydrochloric acid to remove the pyridine, then with aqueous sodium bicarbonate and finally brine to remove inorganic impurities and then dried overnight over anhydrous magnesium sulfate.

Removal of the solvent on the Rotovap left a pale brown oil weighing 211 gm (133% theoretical). This soon solidified to an off-white solid which was dissolved in 600 mls of boiling methyl t-butyl ether to give a pale orange solution. This was filtered to remove some solids then left to crystallize at −5° C. Next day a mass of white crystals had formed which were filtered off and dried to give 109 gm of product (68% theoretical) which melted at 90-4° C. Despite the acid wash, they still had a pyridine smell. The product was recrystallized a second time from fresh MtBE and this time came down as fluffy needles melting sharply at 95-6° C., yield 78 gms, 49% theory. The NMR spectrum is consistent with the desired structure. $^1$H NMR (300 MHz, Chloroform-d) δ 8.09-7.89 (m, 4H), 7.01-6.85 (m, 4H), 6.16-5.94 (m, 2H), 5.58-5.43 (m, 2H), 5.42-5.36 (m, 2H), 5.35-5.28 (m, 2H), 5.03 (t, J=5.0 Hz, 1H), 4.67 (dt, J=4.7, 0.8 Hz, 1H), 4.60 (ddt, J=5.4, 2.8, 1.5 Hz, 4H), 4.18-3.94 (m, 4H).

Preparation of Isosorbide 2,5-bis-(4-glycidylbenzoate) (6a): The reaction was run at room temperature in a 3000 ml Morton flask, the deep indents giving thorough mixing in the hetero-phase reaction mixture. The flask was fitted with a central paddle stirrer and a large dropping funnel (500 ml). The flask was charged with 90 gm (0.193 mole) of the bis-allyloxy ester, dissolved in 1000 mls of dichloromethane and the dropping funnel charged with a solution of 150 gm (0.87 mole) 3-chloro-perbenzoic acid dissolved in 500 ml dichloromethane. The per-acid was readily soluble but the by-product 3-chloro benzoic acid separated out. The per-acid solution was added fairly quickly with vigorous stirring and the mixture stirred for three days. At first very little precipitate came out but gradually a bulky white solid formed in the flask. This was filtered off and dried and weighed 36.9 gms (0.235 mole) which implies a 0.118 molar yield of epoxide (61% theory). The reaction liquors gave a positive starch iodide blue color showing that free peroxy acid was still present, but more was added and the reaction stirred for 24 hours to boost the yield of product. Not much solid came out this time.

A solution of 100 gm sodium metabisulfite in 500 mls distilled water was added, which produced a vigorous evolution of gas and enough heat to boil the dichloromethane. In future the bisulfite will be better added slowly from a dropping funnel. Much precipitated 3-chlorobenzoic acid formed which was filtered off and dried. The two phase mixture of dichloromethane and aqueous solution was shaken with sodium bicarbonate to remove any acid; this caused more brisk effervescence. The mixture was shaken again with 10% sodium bicarbonate but this time there was little effervescence. Finally the lower layer was run off, shaken with saturated brine and then dried for 48 hours over anhydrous sodium sulfate. The desiccant was filtered off and the liquid taken down on the Rotovap to give a thick oil weighing 108.4 gms (113% theory). Rubbing the oil with some of the crude product from a previous run quickly caused it to crystallize. Hot 2-butanone was found to be a good recrystallization solvent and the first crop melted at 115-7° C. after drying. Ethyl acetate also was suitable. The bulk of the crude product was recrystallized from MEK to give 46.1 gm (48%) solid which was dried further and melted at 116-7° C. The liquors gave another 57 gm (59.7%) of cruder material melting at 99-103° C. The NMR spectrum was consistent with the desired bis-epoxide. $^1$H NMR (300 MHz, Chloroform-d) δ 8.30-7.78 (m, 4H), 7.29, 7.14-6.80 (m, 4H), 5.56-5.31 (m, 2H), 5.04 (t, J=5.1 Hz, 1H), 4.67 (dt, J=4.6, 0.7 Hz, 1H), 4.32 (ddd, J=11.1, 3.0, 1.9 Hz, 2H), 4.17-3.74 (m, 6H), 3.48-3.26 (m, 2H), 2.93 (ddd, J=4.9, 4.1, 1.4 Hz, 2H), 2.78 (ddd, J=4.7, 2.6, 1.8 Hz, 2H).

Preparation of Methyl 3-Allyloxybenzoate (2b): The reaction was run in a 2-liter 3-neck flask fitted with a paddle stirrer, reflux condenser and a PE tap funnel. A stream of nitrogen was passed through via a gas inlet at the top of the tap funnel and out via a bubbler on the condenser. The flask was charged with 130 gm anhydrous potassium carbonate, 1000 mls pure dry acetone and 100 gms methyl 3-hydroxybenzoate. It was stirred until all the organics were in solution and heated in a 2-liter heating mantle to a gentle reflux. Ninety-six grams (66 mls) of allyl bromide were placed in the tap funnel and added dropwise. The stirring was brisk enough to maintain the potassium carbonate in suspension and prevent it from caking. The reaction was run for 20 hours overnight. The solids suspended in the flask changed their texture to a fine, dense, chalky white powder as KBr was produced; the solids were filtered off on two thicknesses of #4 paper once the reaction was cool enough.

The acetone filtrate was evaporated on the Rotovap to give a pale yellow oil. This had an odor of allyl bromide, so 100 mls distilled water was added to dissolve the inorganic salts and the mixture stirred at ambient temperature to hydrolyze the allyl bromide to allyl alcohol. The aqueous emulsion was extracted with 3×100 mls of diethyl ether, washed twice with brine solution and dried over anhydrous magnesium sulfate. Evaporation gave an almost colorless oil, weighing 122.7 gm, 96.8% theory. The NMR spectrum showed that the undistilled product was substantially pure.

Preparation of 3-Allyloxybenzoic Acid (3b): A mixture of 116.3 gm (0.61 mole) crude methyl 3-hydroxybenzoate, 42 gm (0.75 mole) potassium hydroxide pellets, 400 mls of methanol and 80 mls of distilled water was refluxed in a 1-liter RB flask for 18 hours overnight while a slow nitrogen sparge was passed through the system. The bulk of the methanol was removed on the Rotovap and the remaining liquid diluted with 500 ml distilled water in a 2-liter beaker. A stir bar was added and the solution acidified by adding enough concentrated HCl to bring the pH to 1-2. A thick, white precipitate came down and after stirring with a glass rod for one hour, the thick mixture was filtered on a 15 cm Buchner funnel using two #4 papers. The solid was washed on the filter repeatedly with distilled water until the washings were neutral. The solid was dried overnight in the vacuum oven at 40° C. and gave 100.4 gms (92%) of white crystals, melting at 77-8° C. The NMR spectrum showed the product was the correct material.

Preparation of Isosorbide 3-allyloxybenzoyl chloride (4b): The reaction was run in a dry 2000 ml 3-neck flask with paddle stirrer, pressure-equalizing dropping funnel and a reflux condenser with a bubbler on top. All glassware was dried at 110° C. first. A nitrogen gas inlet was fitted to the top of the addition funnel. The flask was charged with 500 mls dry chloroform, 89 gm (0.458 mole) of dry 3-allyloxybenzoic acid, 1.0 ml of dimethylformamide and the flask stirred until a clear solution formed. A slow stream of nitrogen passed through the reactor. The addition funnel was charged with 69 gm (0.54 moles, 47.2 mls) of oxalyl chloride and added dropwise at room temperature to the stirred reaction mixture. The gaseous by-products were carried out with the nitrogen flow via a gas absorption device in the hood. The mixture was stirred in the cold for one hour then brought to a gentle reflux for 3-4 hours. It was then left to cool and stir overnight. Next day the volatile components were removed on the Rotovap at 40° C. and 300 mB pressure with a gas trap filled with dry ice and ethanol to condense out any oxalyl chloride. The liquid in the Rotovap flask was orange-brown and cloudy, so it was filtered under vacuum through a medium porosity glass sintered funnel. The clear filtrate was the taken down further on the Rotovap at 50° C. and 100 mB to give a brown oil weighing 105 gms (116% theory). The NMR spectrum showed it was substantially pure.

Preparation of isosorbide bis(3-allyloxybenzoate) (5b): The reaction was run in a 250 ml 3-neck reaction flask with a mechanical stirrer. The flask was equipped with a thermometer and nitrogen purge. 5.11 g (0.035 mole) of isosorbide dissolved in 100 ml pyridine was added to the reactor and stirred mechanically. The apparatus was sparged with a slow nitrogen stream and chilled in an ice bath. As the solution was cooled below 5° C., 15.2 g of 3-allyloxyl benzoyl chloride dissolved in methylene chloride was added to the pyridine solution dropwise. After the addition was completed, the mixture was left to warm up to room temperature and stirred overnight under a slow nitrogen stream. The next day the mixture was poured into a 1000 ml beaker containing 200 ml distilled water and 100 ml of concentrated HCl solution. The whole mixture was stirred mechanically for 30 minutes and extracted with 500 ml MeCl$_2$ in a separatory funnel. The organic phase was then washed with dilute HCl, sat. aq. NaHCO$_3$, then distilled water. After drying with MgSO$_4$, the methylene chloride solution as filtered through a Buchner funnel. The filtrate was then taken down to the Rotovap to take off solvent. The recovered solid weighed 14.9 gm (92% theoretical yield). The NMR spectrum is consistent with the proposed structure. $^1$H NMR (300 MHz, Chloroform-d) δ 7.75-7.48 (m, 4H), 7.35 (dddd, J=8.1, 7.4, 6.9, 0.4 Hz, 2H), 7.13 (dddd, J=8.2, 3.8, 2.6, 1.0 Hz, 2H), 6.06 (ddtd, J=17.3, 10.6, 5.3, 3.8 Hz, 2H), 5.50-5.44 (m, 2H), 5.44-5.36 (m, 2H), 5.31 (ddt, J=10.5, 3.2, 1.4 Hz, 2H), 5.06 (t, J=5.1 Hz, 1H), 4.67 (dt, J=4.7, 0.7 Hz, 1H), 4.58 (tt, J=5.5, 1.5 Hz, 4H), 4.15-3.97 (m, 4H).

Preparation of isosorbide bis(3-glycidylbenzoate) (6b): In a 250 ml 3 neck flask equipped with an additional funnel, a thermometer and nitrogen purge was added 13 g of metachloroperbenzoic acid and 100 ml of methylene chloride. The whole apparatus was cooled in an ice bath. When the solution was cooled below 5° C., 12 g of isosorbide bis(3-allyloxybenzoate) dissolved in 50 ml methylene chloride was added dropwise to the reaction through the additional funnel. After the addition was completed, the mixture was left to stir magnetically at room temperature for three days. A thick white precipitation was formed in the flask. A solution of sodium bisulfite in water was added into the reaction to destroy unreacted metachloroperbenzoic acid until the solution gave a negative starch iodide color. The organic phase was washed with saturated NaHCO$_3$ solution to get rid of 3-chlorobenzoic acid. The organic phase was then washed with saturated sodium chloride solution and dried over MgSO$_4$. The MgSO4 was removed by filtration and the solvent was removed on a Rotovap to give 11 g of the diepoxide (6b, 85% theoretical yield) as a pale yellow oil. The NMR spectrum is consistent with the proposed structure. $^1$H NMR (300 MHz, DMSO-d6) δ 7.75-7.47 (m, 4H), 7.44-7.29 (m, 2H), 7.16 (dddd, J=8.4, 3.7, 2.7, 1.1 Hz, 2H), 5.52-5.33 (m, 2H), 5.06 (t, J=5.1 Hz, 1H), 4.68 (d, J=4.8 Hz, 1H), 4.30 (dt, J=11.0, 2.9 Hz, 2H), 4.18-3.90 (m, 6H), 3.44-3.31 (m, 2H), 2.98-2.88 (m, 2H), 2.83-2.74 (m, 2H).

Preparation of Ethyl 2-Allyloxybenzoate (2c): Unlike the 3- and 4-allyloxy benzoates, 2-allyloxyesters cannot be made by the convenient potassium carbonate/allyl bromide/acetone method, since hydrogen bonding to the ortho-carbonyl group prevents easy alkylation of the hydroxyl. Hence a more drastic method is needed, using a Williamson reaction on ethyl salicylate with allyl bromide and sodium ethoxide. The reaction was run in a 2000 ml 4-neck flask fitted with paddle stirrer, reflux condenser, PE tap-funnel, long-stem thermometer and nitrogen inlet and outlet bubbler on the condenser. All glassware was dried at 110° C. overnight. The flask was charged with 200 mls of "super-dry" ethanol, dried by distillation from magnesium ethoxide. Strictest precautions to prevent ingress of moisture were employed. One gram-atom (23 gms) of sodium metal, cut into convenient small chunks under kerosene and washed with dry hexane, was added to the flask and the mixture allowed to react with stirring until all the metal had dissolved. The mixture began to boil gently but was heated and stirred for another 30 minutes to ensure no metallic sodium was left and all evolution of hydrogen had ceased.

One mole of ethyl salicylate (148 mls, 166 gms) was added dropwise to the flask under a nitrogen sparge. This step evolved considerable heat. Finally, the tap funnel was charged with 108 mls, 158 gms (1.30 moles) allyl bromide, mixed with 300 mls dry ethanol. The reaction mixture was stirred and refluxed steadily and the allyl bromide solution added dropwise. Quite quickly, the reaction mixture went milky, so 350 mls of dry dioxan was added as a co-solvent to maintain a homogeneous solution. Gradually a crystalline solid (NaBr) began to separate out. The mixture was stirred and refluxed overnight.

Next day the byproduct NaBr had formed a thick slurry. This was filtered off on a Buchner funnel and the solid washed well with ordinary ethanol. The filtrate was taken down on the Rotovap to give a yellow oil. More NaBr came out of solution so the mixture was filtered again and washed with ethanol, and re-evaporated. Distilled water (300 mls) was added with brisk stirring to dissolve all the salts. The product was extracted with 2×300 mls diethyl ether in a 1-liter Squibb funnel. The upper ether layer was yellow and the aqueous lower layer colorless. Rather oddly, the aqueous phase was neutral to a pH paper, rather than alkaline, so the combined upper layers were dried over $MgSO_4$ and taken down on the Rotovap to give a pale yellow oil weighing 228.6 gm (110% theory). This was heated for a long time at 60° C. and under 70 mB vacuum until no more weight was lost. The final yield was 192 gm (93% theory).

Preparation of 2-allyloxybenzoic acid (3c): The reaction was run in a 1000 ml 3-neck flask with a magnet stirrer and nitrogen purge. The ethyl 2-allyloxybenzoate (172 g, 0.895 mole) was dissolved in a mixture of methanol (100 ml) and distilled water (500 ml). 40 g of sodium hydroxide (1.0 mole) was added and the whole solution was stirred magnetically at room temperature overnight. The solution was then poured into a 2 L beaker and stirred mechanically with a paddle stirrer. 50 ml of concentrated HCl was added dropwise to produce a thick white precipitate. The white solid was filtered off through a Buchner funnel and washed with distilled water until the washings were neutral to pH paper. The resulting solid was dried overnight under vacuum.

Preparation 2-allyloxybenzyoyl chloride (4c): To a 500 ml 3-neck flask equipped with a condenser, magnetic stirrer, additional funnel, and nitrogen purge was added 35.6 g (0.2 mole) of 2-allyloxy benzoic acid and 200 ml of chloroform was added and the solution was stirred with a magnetic stirrer. 20 ml (0.22 mole) of oxalyl chloride was added dropwise into the solution. After the addition of oxalyl chloride was completed, the solution was stirred magnetically and refluxed overnight. The solution was then cooled to the room temperature and the solvent removed on the Rotovap to recover 40 g of waxy solid which was dissolved in 150 ml of methylene chloride and used in the next reaction.

Preparation of isosorbide bis(2-allyloxybenzoate) (5c): To a 1000 ml 4-neck reaction flask equipped with a mechanical stirrer, condenser, thermometer and nitrogen purge was added 14.6 g (0.1 mole) of isosorbide dissolved in 170 ml of dry pyridine. The apparatus was sparged with a slow nitrogen stream and chilled in an ice/salt bath. When the solution was cooled below 0° C., 40 g (0.2 mole) of 4-allyloxyl benzoyl chloride dissolved in methylene chloride was added dropwise. After the addition was completed, the ice bath was removed and the mixture was left to warm up to room temperature with stirring overnight under a slow nitrogen stream. The next day the mixture was poured into a 2000 ml beaker containing 500 ml distilled water and 200 ml of concentrated HCl solution. The whole mixture was stirred mechanically for 30 minutes and extracted with 500 ml methylene chloride in a reparatory funnel. The organic phase was washed with dilute HCl, sat. aq. $NaHCO_3$ and distilled water. After drying with $MgSO_4$, the methylene chloride solution as filtered and the solvent was removed on a Rotovap to give 35.3 g (80% yield) of a yellow oil. The NMR spectrum is consistent with the proposed structure. $^1H$ NMR (300 MHz, Chloroform-d) δ 7.96-7.75 (m, 2H), 7.48 (ddt, J=8.4, 7.6, 1.8 Hz, 2H), 7.06-6.92 (m, 4H), 6.18-5.98 (m, 2H), 5.54 (dq, J=3.3, 1.6 Hz, 1H), 5.48 (ddd, J=3.3, 2.1, 1.3 Hz, 2H), 5.46-5.37 (m, 1H), 5.37-5.26 (m, 2H), 5.06-4.99 (m, 1H), 4.71 (dt, J=4.6, 0.8 Hz, 1H), 4.65 (ddt, J=8.1, 5.1, 1.6 Hz, 4H), 4.19 (dd, J=10.7, 3.5 Hz, 1H), 4.13 (d, J=0.9 Hz, 1H), 4.10 (dd, J=5.3, 4.4 Hz, 1H), 4.06-3.88 (m, 1H).

Preparation of isosorbide bis(2-glycidylbenzoate) (6c): In a 500 ml 3 neck flask equipped with a magnetic stirrer and nitrogen purge was added 23.3 g (0.05 mole) of isosorbide bis(2-allyloxy benzoate) and 200 ml methylene chloride. To the stirred solution was added 21 g (0.12 mole) of metachloroperbenzoic acid which dissolved completely. On stirring overnight at room temperature, a thick white precipitation of m-chlorobenzoic acid formed. Solid sodium bisulfite was added in small portions to destroy unreacted metachloroperbenzoic acid until peroxide was no longer detected with starch/iodide paper. The methylene chloride solution was cooled to 10° C. to precipitate most of the m-chlorobenzoic acid and filtered. The methylene chloride solution was washed with saturated aq. $NaHCO_3$ solution until gases were no longer released. The organic phase was then washed with saturated sodium chloride solution and distilled water and dried over $MgSO_4$. After filtering off $MgSO_4$, the solvent was removed on a Rotovap to recover a viscous yellow oil weighing 12 g (48% theoretical yield). The NMR spectrum is consistent with the proposed structure. $^1H$ NMR (300 MHz, Chloroform-d) δ 7.94-7.71 (m, 2H), 7.47 (ddt, J=8.4, 7.4, 2.0 Hz, 2H), 7.10-6.92 (m, 4H), 5.47 (m, 1H), 5.41 (td, J=5.7, 4.9 Hz, 1H)), 5.04 (t, J=5.1 Hz, 1H), 4.71 (d, J=4.7 Hz, 1H), 4.39-4.24 (m, 2H), 4.24-3.91 (m, 6H), 3.40 (tdt, J=5.3, 4.1, 2.7 Hz, 2H), 2.95-2.77 (m, 4H).

Cured Isosorbide Epoxies

In certain embodiments of the present invention an isosorbide epoxy synthesized as described above or otherwise is cured with a crosslinker. As experimental examples some of the crosslinkers that may be employed include, but are not limited to, the aliphatic amine-Jeffamine™ T403, high molecular weight polyamine-Versamid® 140, EPIKURE™ curing agent 3300 containing isophorone diamine, and the anhydride curing agent methyl-5-norbornene-2,3-dicarboxylic anhydride (NMA) with benzyl dimethyl amine (BDMA) as catalyst. As is to be expected, the curing procedures are varied corresponding to the different curing agent as shown in Table 1, and the present invention embraces different curing procedures for different epoxide/crosslinking combinations.

TABLE 1

Curing schedule for different curing agents

| Curing Agent | Curing Procedure |
| --- | --- |
| Jeffamine™ T403 | 80° C. for 6 hrs 125° C. for 3 hrs |
| Versamid™ 140 | 80° C. for 6 hrs |
| EPIKURE™ 3300 | 80° C. for 6 hrs 150° C. for 3 hrs |
| NMA + BDMA | 80° C. for 6 hrs 170° C. for 3 hrs |

Both isosorbide diglycidyl ether and bisisosorbide triglycidyl ether have a strong affinity to water, in which isosorbide functions like a cyclized polyethylene glycol and chemically linked with different ratio of glycidyl ether. Since one liter of water can dissolve 8 kg of isosorbide and glycidyl ether can be easily hydrolyzed to form hygroscopic glycerin, when glycidyl ether derivatives of isosorbide are cured with a water soluble aliphatic polyether tri-amine, such as Jeffamine™ T403, the significant depression of Tg down to 48° C. was observed for these epoxies compared with BPA epoxies of 92° C. By submerging these two cured epoxies in water for a few hours, both epoxies burst and fall apart to small pieces similar to a burst drug release system due to the hydrolysis and stress caused by the water expansion. As both isosorbide diglycidyl ether and bisisosorbide triglycidyl and Jeffamine™ T403 are water soluble, different hydrogels derived from isosorbide can be formulated with a variety of hydration levels as extracellular matrix for many biomedical applications. Isosorbide diglycidyl ether and bisisosorbide triglycidyl ether themselves can also be used as "green" crosslinkers for many different bio-composites.

When isosorbide diglycidyl ether and bisisosorbide triglycidyl ether were cured with a cycloaliphatic diamine, EPIKURE™ 3300, and soaked in water at RT for 6 days, the water uptake ratio of cured isosorbide diglycidyl ether was slightly lower at 34.4 wt % compared with that of cured bisisosorbide triglycidyl ether at 53.6 wt %. The lower moisture pickup property of isosorbide diglycidyl ether comes from 1) bisisosorbide triglycidyl ether with a center hydroxide group showed higher affinity to water, and 2) isosorbide diglycidyl ether offers almost twice the epoxy group content for curing compared with bisisosorbide triglycidyl ether, which was calculated based on the epoxide equivalent weight of isosorbide diglycidyl ether at 129 Daltons and bisisosorbide triglycidyl ether at 223 Daltons. The greater epoxide content can provide the higher crosslinking density therefore a higher Tg and the lower moisture pickup property.

Figure 2:
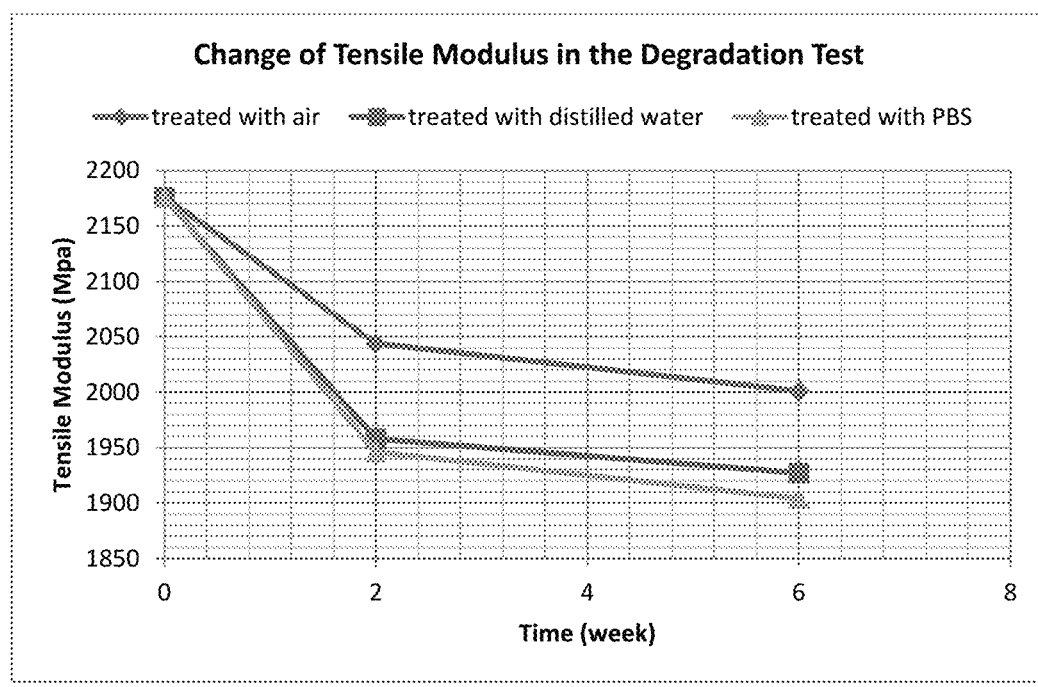
FIG. 2 is a graphical depiction of change in tensile modulus during degradation testing in accordance with one or more embodiments of the present invention.

When bisisosorbide triglycidyl ether was cured with the anhydride curing agent NMA with BDMA as catalyst, the material showed high Tg at 119° C. but strong affinity to water. The dried epoxies were treated with three media, air, distilled water and phosphate buffer solution (PBS) for different periods of time. The dramatic drop of Tg and tensile modulus of NMA cured isosorbide glycidyl ethers in water and PBS conditions demonstrate that water is the main impetus for the degradation of the isosorbide epoxies as shown in FIGS. 1 and 2.

Meanwhile, since Tg didn't change much in the first two weeks for all three conditions but changed significantly at six weeks especially in water and PBS conditions, it can be inferred that the degradation happened from the outer surface of the epoxy, then penetrated through the bulk of the specimen. The structural change on the sample surface can distinctly affect its mechanical property as shown in FIG. 2. Because degradation of isosorbide glycidyl ethers occurred both chemically and physically, where hydrolysis of polyesters and water swelling can initiate formation of small voids and cracks on the sample surface, the tensile modulus of water-treated epoxies dropped continuously over time. With a slower degradation rate, NMA-cured isosorbide glycidyl ethers can be used as a continuous drug delivery system.

Figure 3:
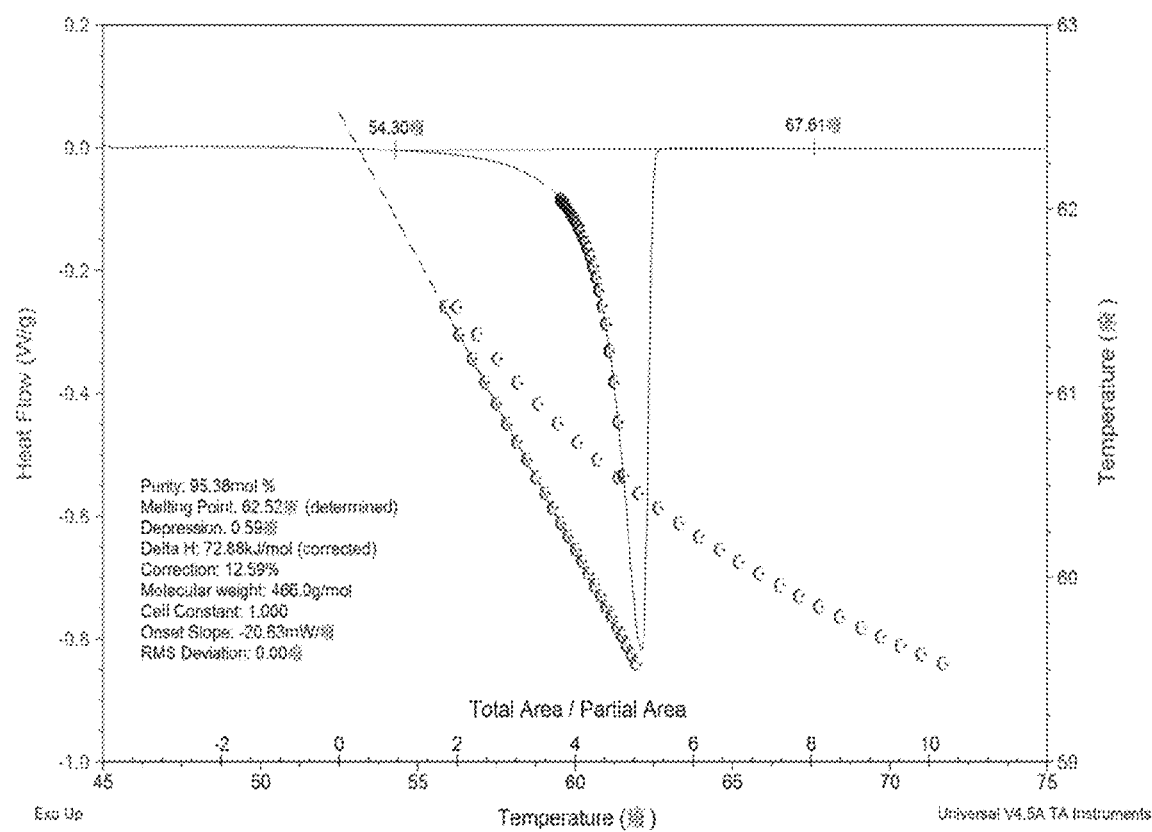
FIG. 3 is a graphical depiction of purity of isosorbide bis(2-allyoxybenzoate) on DSC in accordance with one or more embodiments of the present invention.

The isosorbide bis(glycidyl benzoate)s ("IsoBGBs") were designed to enhance the hydrophobicity of isosorbide-derived epoxies by aromatically modifying the backbones of the isosorbide epoxies and adding to the steric hindrance between the hydroscopic isosorbide and glycidyl ethers. Three types of IsoBGB were developed with different steric profiles as examples of types of epoxies that could be synthesized: IsoB4 GB, IsoB3 GB and IsoB2 GB. These three examples are included for illustration and not as an exhaustive list of all epoxies of the present invention. The purity of the synthesized crystals was measured by DSC based on the Van't Hoff law of melting point depression of eutectic systems. The purity of synthesized intermediate isosorbide bis(2-allyoxybenzoate) is shown as an example in FIG. 3.

Figure 4:
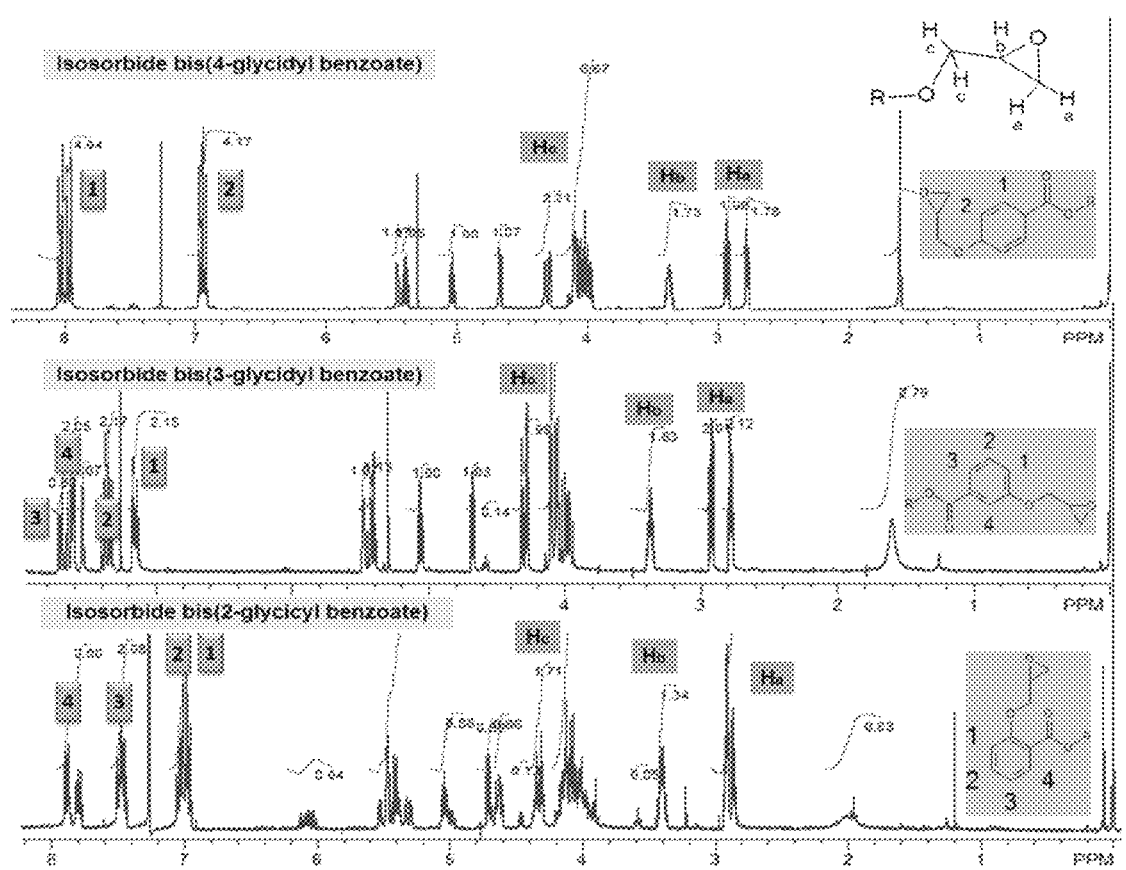
FIG. 4 is a graphical depiction of NMR spectra of isosorbide diglycidyl benzoates in accordance with one or more embodiments of the present invention.

Three experimental embodiments of the present invention, IsoB4 GB, IsoB3 GB and IsoB2 GB, are viscous liquids and have been characterized by NMR as shown in FIG. 4. The 1:1 integrated ratio of two protons around the 5.4 ppm illustrates the esterification reaction happened in both hydroxyl groups of isosorbide. The different chemical shift patterns of aromatic protons for three IsoBGBs was assigned between 7 ppm to 8 ppm region to illustrate the different steric structure of three compounds. The disappearance of allylic protons at 6 ppm and appearance of epoxy protons at 3~4 ppm region were used to follow the epoxidation reaction. Because the glycidyl ether group of IsoB2 GB is on the ortho-position, for said embodiment its precursor isosorbide bis(2-allyoxy benzoate) was least approachable for epoxidation. More impurities were obtained in preparation of IsoB2 GB. Its steric hindrance slowed down its epoxidation rate and epoxidation efficiency. In order to confirm the chemical structure of each IsoBGB, all protons were assigned on the NMR spectrum and the epoxy equivalent weight of IsoBGB was calculated at 249 g/epoxy based on its structure.

The prepared IsoBGBs were cured with 4 different commercial hardeners at various crosslinking conditions for illustration only. Certainly a wide variety of other hardeners could be used.

In one embodiment of the present invention, when IsoBGBs were cured with Jeffamine™ T403 polyetheramine as shown below wherein R=C2H5, n=1, x+y+z=5-6; MW=440.

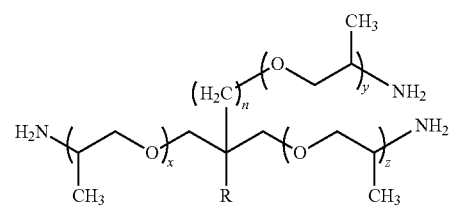

Jeffamine™ T403 polyetheramine

One epoxy group reacts with one amine-hydrogen of the hardener. Based on the ratio between the epoxide equivalent weight and amine-hydrogen equivalent weight of Jeffamine™ T403 at 82.5, the theoretical stoichiometric ratio between the epoxy and hardener can be calculated as indicative information. In order to obtain the maximum crosslinking density and hence maximum Tg, different mixing ratios around the stoichiometric ratio between the epoxy and hardeners was tested in the curing system.

Figure 5:
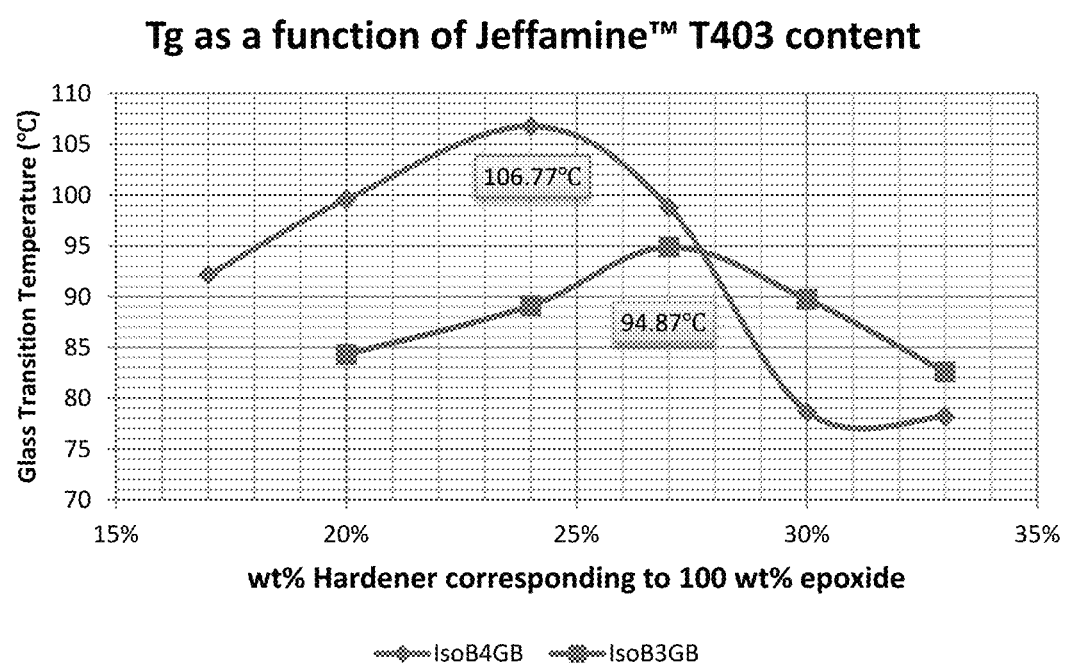
FIG. 5 is a graphical depiction of Tg as a function of Jeffamine™ T403 content of IsoB4 GB and IsoB3 GB in accordance with one or more embodiments of the present invention.

As shown in FIG. 5, with different amounts of incorporated curing agent, Tg of Jeffamine™ T403-cured IsoBGBs can vary to a great extent from 78° C. to 106° C. for embodiments of the present invention. Any excess hardeners with extra aliphatic amines and free epoxy monomer in the curing system can act as plasticizers to depress the Tg of the epoxy resin. When the amount of epoxide group was matched to the amine hydrogen of hardener, the maximum Tg was reached at 106.77° C. for IsoB4 GB and 94.87° C. for IsoB3 GB embodiments, respectively. Since the IsoB2 GB embodiment of the present invention contains more impurity, thus lower crosslinking density, due to the steric hindrance of epoxidation, its Tg is much lower than that of IsoB4 GB and IsoB3 GB. While IsoB4 GB and IsoB3 GB showed comparable and even higher Tg compared with Jeffamine™ T403 cured BPA epoxide like EPON828 with Tg at 92° C. Adding the benzoyl group between isosorbide and glycidyl ether is efficient in modifying the backbone structure of isosorbide glycidyl ethers.

Figure 6:
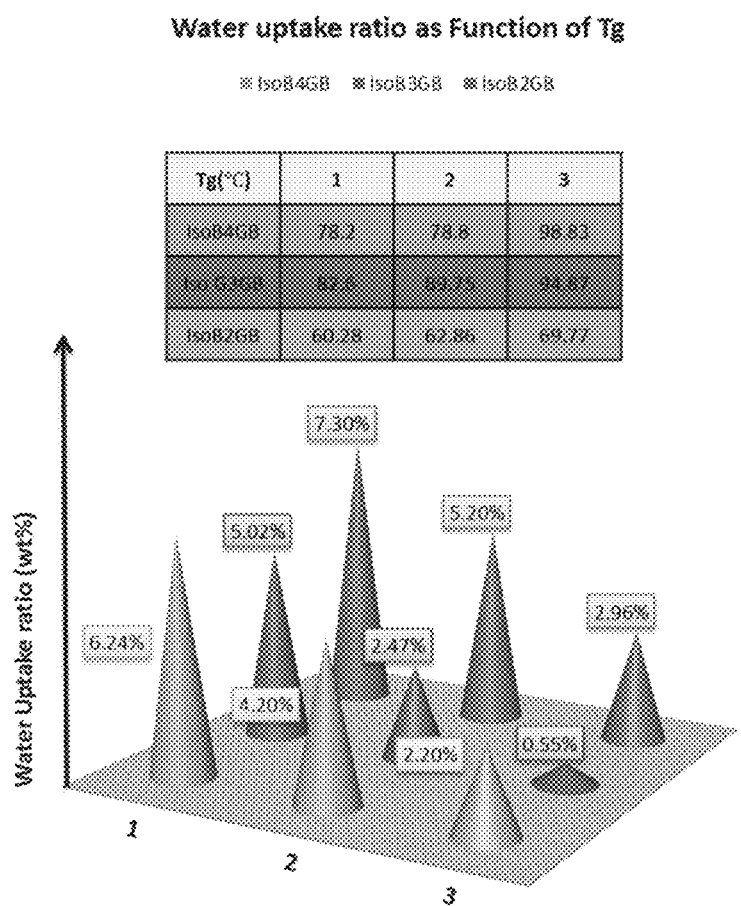
FIG. 6 is a graphical depiction of water uptake ratio as a function of Tg in accordance with one or more embodiments of the present invention.

After soaking the cured IsoBGBs in water for a few days until saturation, the weight gain of the epoxy was measured and converted to water uptake ratio. Compared with bisisosorbide triglycidyl ether with water uptake ratio of 35 wt % after a few hours water storage, IsoBGBs showed significant improvement in hydrophobicity. An embodiment of the present invention comprising IsoB3 GB with maximum Tg showed lowest water absorption ratio down to 0.55 wt %. It is already close to the water uptake ratio of Jeffamine™ T403 cured EPON 828 at 0.25~0.5 wt %. The increased water resistance emanates from the addition of hydrophobic aromatic moiety in the polymer chain and reduced intramolecular hydrogen bonding by putting the steric hindrance between hydroscopic isosorbide and glycidyl ether for said embodiment. Since both Tg and moisture pick-up show similar dependence on the hardener concentration which highly relates to the crosslinking density of epoxy, the higher crosslinking density of epoxy can lead to higher Tg thus lower water absorption property of isosorbide epoxy resins as shown in FIG. 6.

In a further embodiment, when IsoBGBs were cured with a polyfunctional aliphatic amine, Versamid® 140 with both amine and amide reactive groups as shown below, the ratio of polyamide to epoxy becomes less critical as the average H-equivalent could be significantly different due to the polymer development (molecular weight distribution) and the purity of commercial amine.

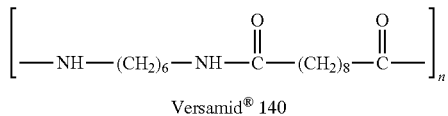

Versamid® 140

Figure 7:
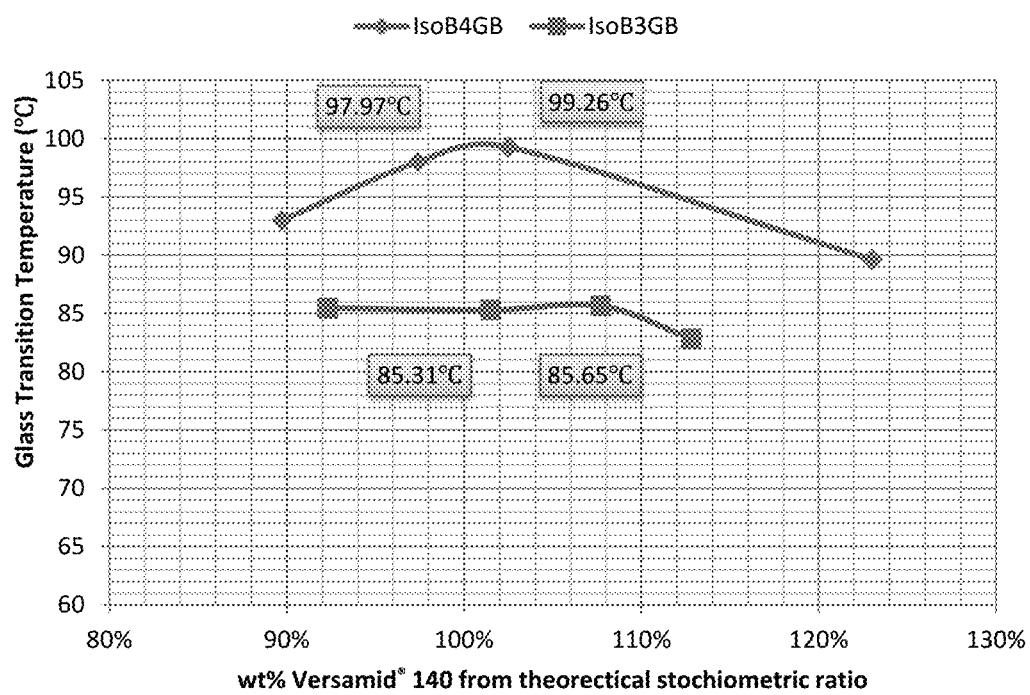
FIG. 7 is a graphical depiction of Tg of certain isosorbide diglycidyl benzoates as a function of hardener content (Versamid® 140) in accordance with one or more embodiments of the present invention.

With variation of hardener concentration, Tg of Versamid® 140-cured IsoBGBs remains around 95° C. for IsoB4 GB and 85° C. for IsoB3 GB as shown in FIG. 7.

Figure 8:
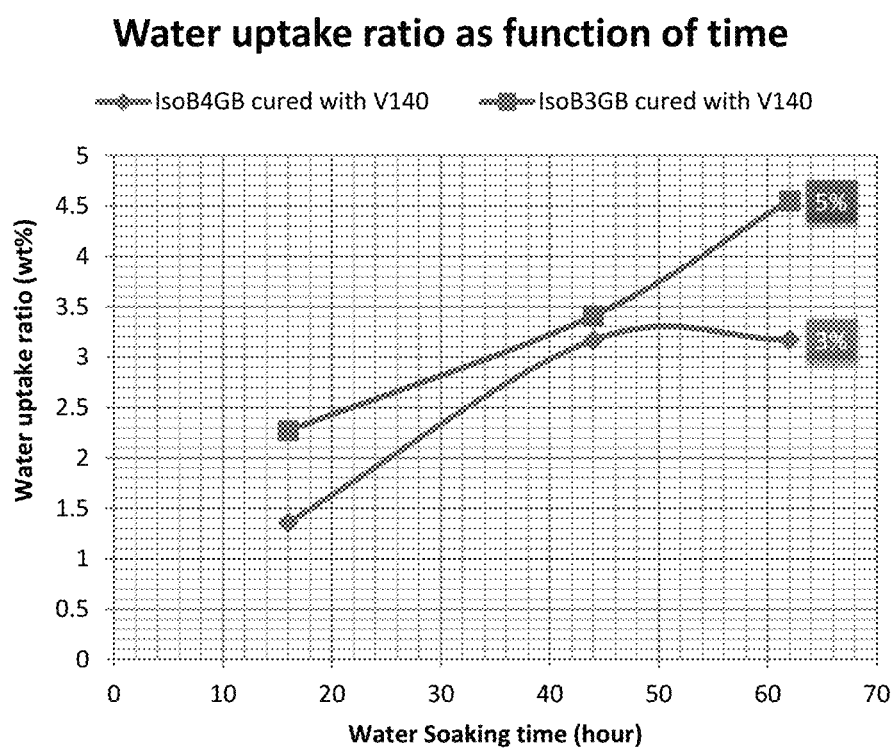
FIG. 8 is a graphical depiction of water uptake ratio of Versamid® 140-cured isosorbide diglycidyl benzoates as a function of time in accordance with one or more embodiments of the present invention.

The 10° C. difference of Tg between IsoB4 GB and IsoB3 GB is likely related to their different steric profile of the epoxide group on the benzene ring. The stronger steric hindrance for epoxidation leading to the lower efficiency of crosslinking can result in the lower crosslinking density of epoxy resin. With lower crosslinking density, the lower the Tg. The IsoB2 GB embodiment of the present invention showed slightly higher water uptake properties, up to 5 wt %, and slower saturation rate as shown in FIG. 8.

When IsoBGBs were cured with EPIKURE™ 3300, in accordance with certain embodiments of the present invention, it was found that there was a very low viscosity, light-colored cycloaliphatic amine curing agent containing isophorone diamine as shown below:

Isophorone diamine

Figure 9:
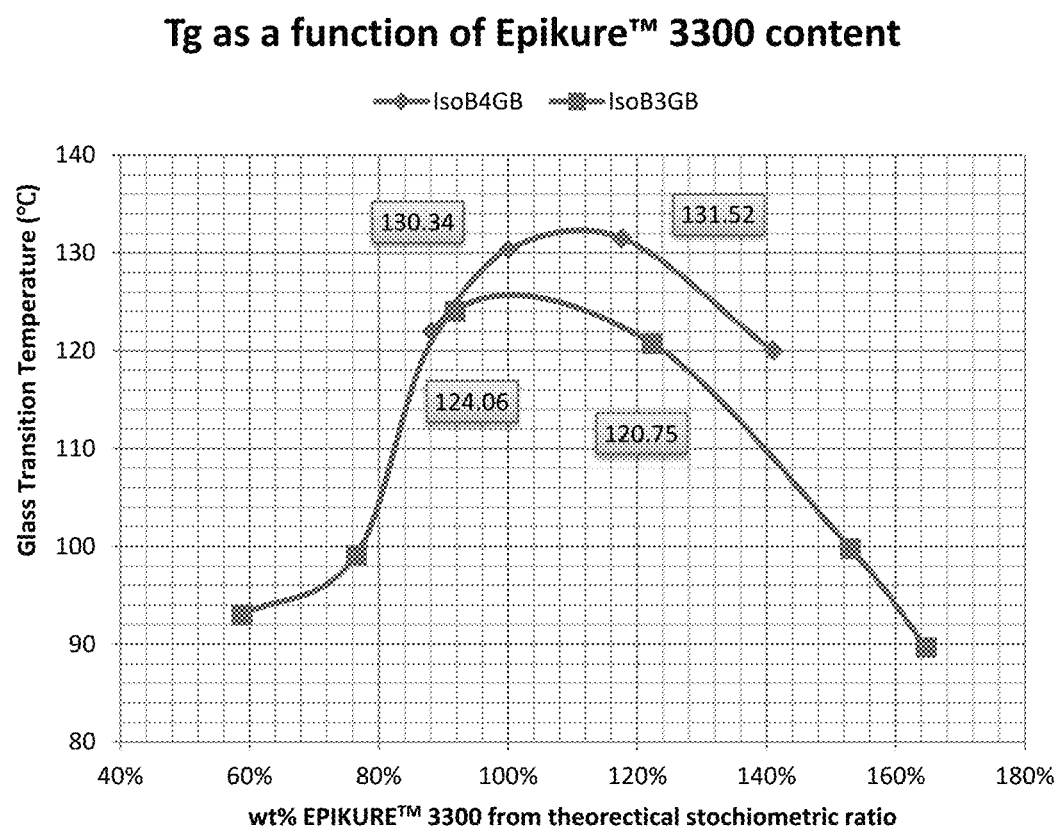
FIG. 9 is a graphical depiction of Tg as a function of hardener content (Epikure™ 3000) in IsoB4 GB and IsoB3 GB in accordance with one or more embodiments of the present invention.
Figure 10:
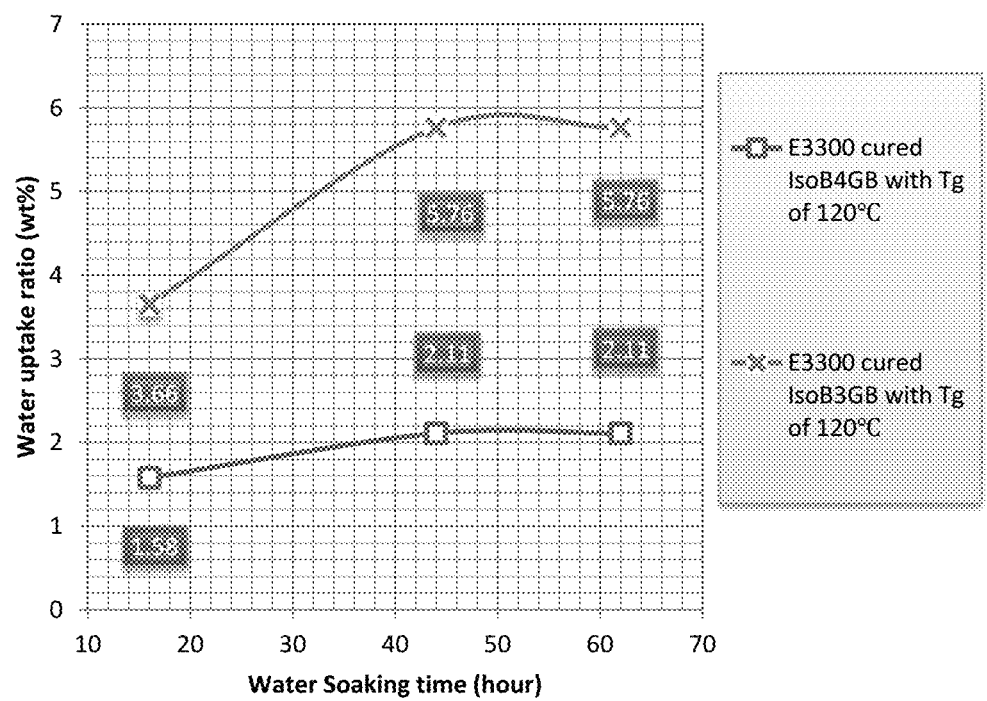
FIG. 10 is a graphical depiction of water uptake of EPIKURE™ 3300-cured isosorbide diglycidyl benzoates as a function of time in accordance with one or more embodiments of the present invention.

The rigid structure of isophorone diamine can stiffen the polymer chain, thus raising Tg and increasing the solvent resistance of crosslinked epoxide. Since the crosslinking reaction with EPIKURE™ 3300 is sensitive to the hardener concentration, different mixing ratios between epoxide and crosslinker were tested by using theoretical H-equivalent of EPIKURE™ 3300 at 42.6 as indicative information. Tg of EPIKURE™ 3300-cured IsoBGBs was raised to 131° C. for IsoB4 GB and 124° C. for IsoB3 GB as shown in FIG. 9. With less steric hindrance, embodiments of the present invention utilizing IsoB4 GB showed higher maximum Tg and lower water absorption, down to 2.11 wt %, compared with embodiments utilizing IsoB3 GB of 5.76 wt % at the same Tg as shown in FIG. 10.

When IsoBGBs were cured with the more hydrophobic anhydride curing agent NMA with catalyst BDMA (shown below) in accordance with certain embodiments of the present invention, Tg of cured IsoBGBs was raised to 136° C. for IsoB4 GB, 116° C. for IsoB3 GB and 100° C. for IsoB2 GB, respectively.

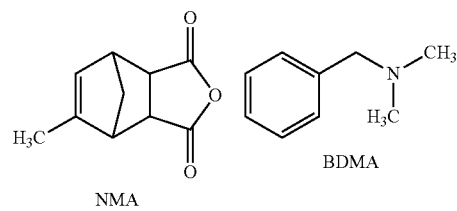

NMA              BDMA

Figure 11:
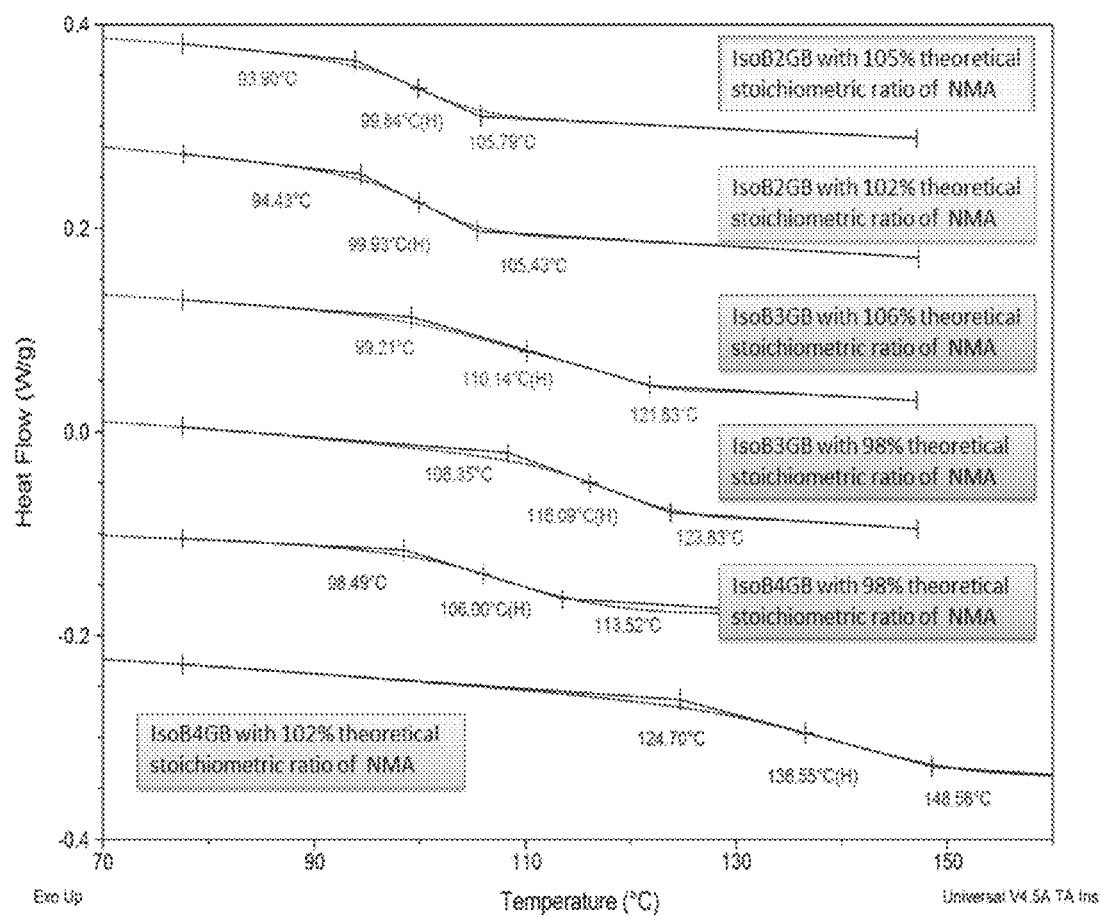
FIG. 11 is a graphical depiction of Tg of NMA-cured isosorbide diglycidyl benzoates in accordance with one or more embodiments of the present invention.
Figure 12:
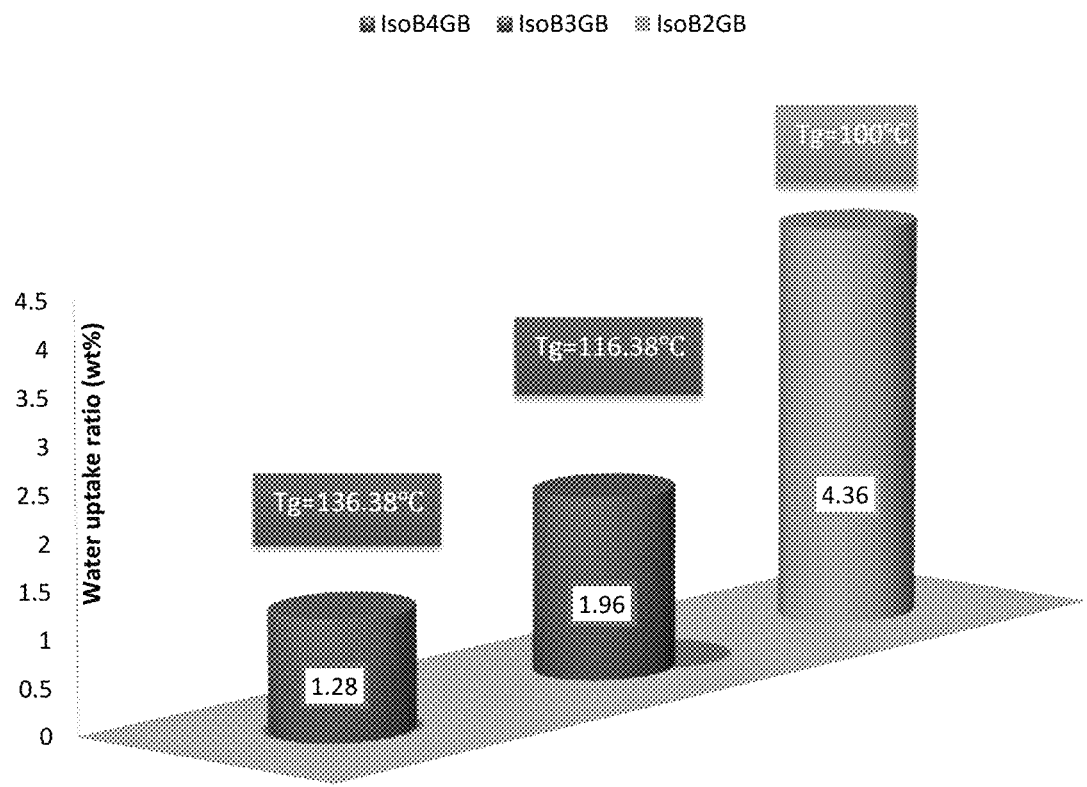
FIG. 12 illustrates water uptake of NMA-cured isosorbide diglycidyl benzoates in accordance with one or more embodiments of the present invention.

The maximum crosslinking density was reached when 100% stoichiometric ratio of hardener was used, which was calculated based on the ratio between epoxy equivalent weight of IsoBGBs at 249 g/epoxy and amine-hydrogen equivalent weight of NMA at 178 for those embodiments respectively. By changing the position of the glycidyl ether group from para-subsitution to meta- to ortho-subsititution on the benzene ring, both epoxidation rate and crosslinking efficiency of epoxide follows the order: IsoB4 GB>IsoB3 GB>IsoB2 GB, in which IsoB2 GB posesses the greatest amount of unreacted allyoxy benzoate ester as impurity, therefore having the lowest Tg, while IsoB4 GB and IsoB3 GB presented higher Tg as shown in FIG. 11 in accordance with certain exemplary embodiments disclosed herein. Water sensitivity of NMA-cured IsoBGBs also follows this order. IsoB2 GB showed higher water uptake ratio at 4.36 wt % compared to IsoB3 GB with water uptake ratio of 1.96 wt % and IsoB4 GB with water uptake ratio of 1.28 wt % as shown in FIG. 12.

Since water sensitivity of isosorbide-based epoxy is a function of the local chemical environment, the aromatic modified isosorbide epoxy with increased hydrophobic moiety and decreased intermolecular hydrogen bonding showed significant reduction of water absorption in all four curing systems. In certain embodiments of the present invention, through modifying the backbone of isosorbide epoxy with hydrophobic functional group(s) and adding steric hindrance between the hydroscopic isosorbide and glycidyl ethers, chemically modified isosorbide glycidyl ethers like IsoB-GBs present promising alternatives to be used as hydrophobic building blocks, replacing "xenoestergen" BPA in many different end-uses, notably in the food packaging and surface coating markets.

Meanwhile, because crosslinking density also plays an important role in determination of epoxy performance for certain embodiments of the present invention, different types and amounts of hardeners may be matched to each epoxy system to improve the thermal and solvent resistance of epoxies. In the case of IsoBGBs, since both the type and concentration of hardeners and steric environment of epoxide showed the ability to influence the crosslinking density, understanding the composition-structure-property-performance relationship in IsoBGB-based thermosets becomes more important in designing new sugar based epoxides. With unique built-in molecular geometry, chirality and stereochemistry, isosorbide-derived composites with comparable or improved structural performance are finding widespread applications due to their low cost and environmental acceptability.

By changing the curing agent and the curing conditions, the water uptake ratio of isosorbide-based epoxy may be varied. Controlling factors include crosslinking density, the chemistry of the cross-linking agent and the number of free hydroxyl groups on the backbone of the epoxy. By adding the hydrophobic functional group into the backbone of isosorbide epoxy or adjusting the amount and type of crosslinker, the mechanical properties and water uptake ratios of isosorbide-derived epoxies may be modified for different applications. The high water uptake epoxy with controllable biodegradation rate may be used as a drug delivery system or extracellular matrix for biomedical applications while the low water uptake epoxies with strong mechanical properties could be used for can coatings, bone cements and other industrial additives and adhesives.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

REFERENCES

1. Fernando S, Adhikari S, Chandrapal C, Murali N. Biorefineries: Current Status, Challenges, and Future Direction. Energy & Fuels. 2006; 20(4):1727-37. doi:10.1021/ef060097w.
2. Gontard N, Guilbert S. Bio-packaging: technology and properties of edible and/or biodegradable material of agricultural origin. Food Packaging and Preservation. Springer; 1994.
3. Georgopoulos S T, Tarantili P A, Avgerinos E, Andreopoulos A G, Koukios E G. Thermoplastic polymers reinforced with fibrous agricultural residues. Polymer Degradation and Stability. 2005; 90(2):303-12. doi:DOI: 10.1016/j.polymdegradstab.2005.02.020.
4. Narayan R. Polymers from Agricultural Coproducts. ACS Symposium Series, vol 575. American Chemical Society; 1994.
5. Kricheldorf H R. "Sugar Diols" as Building Blocks of Polycondensates. 1997; 37(4):599-631.
6. Mohanty A K, Misra M, Drzal L T. Sustainable Bio-Composites from Renewable Resources: Opportunities and Challenges in the Green Materials World Journal of Polymers and the Environment. 2004; 10:19-26.
7. Azapagic A, Emsley A, Hamerton I. Polymers: the environment and sustainable development. West Sussex, England; Hoboken, N.J.: J. Wiley; 2003.
8. DeSimone L D, Popoff F. Eco-Efficiency: The Business Link to Sustainable Development. The MIT Press; 2000.
9. Willke T, Vorlop K D. Industrial bioconversion of renewable resources as an alternative to conventional chemistry. Applied Microbiology and Biotechnology. 2004; 66(2): 131-42.
10. Fukushima K, Kimura Y. Stereocomplexed polylactides (Neo-PLA) as high-performance bio-based polymers: their formation, properties, and application. Polymer International. 2006; 55(6):626-42.
11. Wool R P, Sun X S. Bio-based polymers and composites. Boston: Elsevier Academic Press; 2005
12. Mohanty A K, Misra M, Hinrichsen G. Biofibres, biodegradable polymers and biocomposites: An overview. Macromolecular Materials and Engineering. 2000; 276-277(1):1-24.
13. Thiruvenkatachari R, Ouk Kwon T, Shik Moon I. Application of Slurry Type Photocatalytic Oxidation-Submerged Hollow Fiber Microfiltration Hybrid System for the Degradation of Bisphenol A (BPA). Separation Science and Technology. 2005; 40(14):2871-88. doi: 10.1080/01496390500333160.
14. Haishima Y, Hayashi Y, Yagami T, Nakamura A. Elution of bisphenol-A from hemodialyzers consisting of polycarbonate and polysulfone resins. Journal of Biomedical Materials Research. 2001; 58(2):209-15. doi: 10.1002/1097-4636(2001)58:2<209::aid-jbm1009>3 0.0. co; 2-7.
15. Yamamoto T, Yasuhara A, Shiraishi H, Nakasugi O. Bisphenol A in hazardous waste landfill leachates. Chemosphere. 2001; 42(4):415-8. doi: 10.1016/s0045-6535 (00)00079-5.
16. Staples C A, Dome P B, Klecka G M, Oblock S T, Harris L R. A review of the environmental fate, effects, and exposures of bisphenol A. Chemosphere. 1998; 36(10): 2149-73. doi:10.1016/s0045-6535(97)10133-3.
17. Schafer T E, Lapp C A, Hanes C M, Lewis J B, Wataha J C, Schuster G S. Estrogenicity of bisphenol A and bisphenol A dimethacrylate in vitro. Journal of Biomedi- 18. Steinmetz R, Mitchner N A, Grant A, Allen D L, Bigsby R M, Ben-Jonathan N. The Xenoestrogen Bisphenol A Induces Growth, Differentiation, and c-fos Gene Expression in the Female Reproductive Tract. Endocrinology. 1998; 139(6):2741-7. doi:10.1210/en.139.6.2741.
19. Krishnan A, Stathis P, Permuth S, Tokes L, Feldman D. Bisphenol-A: an estrogenic substance is released from polycarbonate flasks during autoclaving. Endocrinology. 1993; 132(6):2279-86. doi:10.1210/en.132.6.2279.
20. Feng X, East Anthony J, Hammond W, Jaffe M. Sugar-Based Chemicals for Environmentally Sustainable Applications. Contemporary Science of Polymeric Materials. ACS Symposium Series, vol 1061: American Chemical Society; 2010. p. 3-27.
21. Bengs H, Schoenfeld A, Boehm G, Weis S, Clauss J, inventors; Celanese Ventures GmbH, assignee. Biodegradable Polymers Based on Natural and Renewable Raw Materials Especially Isosorbide2002.
22. Chatti S, Bortolussi M, Loupy A. Synthesis of New Diols Derived from Dianhydrohexitols Ethers under Microwave-Assisted Phase Transfer Catalysis. Tetrahedron. 2000; 56(32):5877-83. doi:Doi: 10.1016/s0040-4020(00) 00539-1.
23. Chatti S, Bortolussi M, Loupy A. Synthesis of diethers derived from dianhydrohexitols by phase transfer catalysis under microwave. Tetrahedron Letters. 2000; 41(18): 3367-70. doi:Doi: 10.1016/s0040-4039(00)00416-0.
24. Fenouillot F, Rousseau A, Colomines G, Saint-Loup R, Pascault J P. Polymers from renewable 1,4:3,6-dianhydrohexitols (isosorbide, isomannide and isoidide): A review. Progress in Polymer Science. 2010; 35(5):578-622. doi:DOI: 10.1016/j.progpolymsci.2009.10.001.
25. Feng X, East A J, Hammond W B, Zhang Y, Jaffe M. Overview of advances in sugar-based polymers. Polymers for Advanced Technologies. 2011; 22(1):139-50. doi: 10.1002/pat.1859.
26. Xianhong F, Saini P, Vusto G, Hammond W B, East A J, Jaffe M, editors. Synthesis and thermal analysis of sugar based polyesters as candidate of high performance biopolymers. Bioengineering Conference (NEBEC), 2011 IEEE 37th Annual Northeast; 2011 1-3 Apr. 2011.
27. Mills J A. The Stereochemistry of Cyclic Derivatives of Carbohydrates. In: Melville L W, editor. Advances in Carbohydrate Chemistry. Academic Press; 1955. p. 1-53.
28. Storbeck R, Rehahn M, Ballauff M. Synthesis and properties of high-molecular-weight polyesters based on 1,4:3,6-dianhydrohexitols and terephthalic acid. Die Makromolekulare Chemie. 1993; 194(1):53-64.
29. Storbeck R, Ballauff M. Synthesis and thermal analysis of copolyesters deriving from 1,4:3,6-dianhydrosorbitol, ethylene glycol, and terephthalic acid. J Appl Polym Sci. 1996; 59:1196-202.
30. Cope A C, Shen T Y. The Stereochemistry of 1,4:3,6-Dianhydrohexitol Derivatives1. Journal of the American Chemical Society. 1956; 78(13):3177-82. doi:10.1021/ja01594a055.
31. Morrison J G, inventor MARTIN MARIETTA CORP, assignee. Polyglycidyl ethers of ether anhydro hexitols, method of production, and aqueous solutions thereof. United States 1962.
32. East A, Jaffe, Michael, Zhang, Yi, Catalani, Luiz H., inventor New Jersey Institute of Technology (Newark, N.J., US), assignee. Thermoset epoxy polymers from renewable resources. United States 2008.
33. Xianhong F, DeMartino R, East A J, Hammond W B, Jaffe M, editors. Synthesis and characterization of isosorbide derived polyols as highly effective humectants. Bioengineering Conference, Proceedings of the 2010 IEEE 36th Annual Northeast; 2010 26-28 Mar. 2010.
34. Xianhong F, Jaffe M, Hammond W B, East A J, editors. Synthesis of corn-derived carbohydrate derivatives as effective multifunctional sunscreens. Bioengineering Conference, 2009 IEEE 35th Annual Northeast; 2009 3-5 Apr. 2009.

What is claimed is:

1. An isosorbide-derived epoxy resin composition comprising an isosorbide glycidyl ether and a curing agent wherein the isosorbide glycidyl ether is an isosorbide bis (glycidyl benzoate).

2. The composition of claim 1 wherein the isosorbide bis(glycidyl benzoate) is selected from the group consisting of isosorbide bis(4-glycidyl benzoate), isosorbide bis(3-glycidyl benzoate) and isosorbide bis(2-glycidyl benzoate).

3. The composition according to claim 1 wherein the curing agent is selected from the group consisting of a polyetheramine crosslinker, a polyamide resin crosslinker, an isophorone diamine crosslinker, and methyl-5-norbornene-2,3-dicarboxylic anhydride (NMA) with benzyl dimethyl amine (BDMA) as catalyst.

4. A compound selected from the group consisting of isosorbide bis(4-glycidyl benzoate), isosorbide bis(3-glycidyl benzoate) and isosorbide bis(2-glycidyl benzoate).

5. A method of making an isosorbide-derived epoxy resin composition comprising combining an isosorbide glycidyl ether with a curing agent wherein the isosorbide glycidyl ether is an isosorbide bis(glycidyl benzoate).

6. The method of claim 5 wherein the isosorbide bis (glycidyl benzoate) is selected from the group consisting of isosorbide bis(4-glycidyl benzoate), isosorbide bis(3-glycidyl benzoate) and isosorbide bis(2-glycidyl benzoate).

7. The method according to claim 5 wherein the curing agent is selected from the group consisting of a polyetheramine crosslinker, a polyamide resin crosslinker, an isophorone diamine crosslinker, and methyl-5-norbornene-2,3-dicarboxylic anhydride (NMA) with benzyl dimethyl amine (BDMA) as catalyst.

* * * * *